United States Patent
McKune

(10) Patent No.: US 7,134,144 B2
(45) Date of Patent: Nov. 7, 2006

(54) DETECTING AND RESPONDING TO A CLOCK ROLLBACK IN A DIGITAL RIGHTS MANAGEMENT SYSTEM ON A COMPUTING DEVICE

(75) Inventor: Jeffrey R. McKune, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 09/796,906

(22) Filed: Mar. 1, 2001

(65) Prior Publication Data

US 2002/0169974 A1    Nov. 14, 2002

(51) Int. Cl.
*G06F 7/04*    (2006.01)
*G06F 11/30*   (2006.01)
*G06F 1/04*    (2006.01)

(52) U.S. Cl. .................. 726/26; 726/30; 713/187; 713/600

(58) Field of Classification Search ............... 380/201; 705/57; 713/178
See application file for complete search history.

(56) References Cited

U.S. PATENT DOCUMENTS

| 5,946,672 | A  | * | 8/1999  | Chrosny et al. ........... 705/410 |
| 6,310,956 | B1 | * | 10/2001 | Morito et al. ............. 380/201 |
| 6,389,402 | B1 | * | 5/2002  | Ginter et al. ............. 705/51  |
| 6,442,691 | B1 | * | 8/2002  | Blandford ................. 713/178 |
| 6,477,649 | B1 | * | 11/2002 | Kambayashi et al. ....... 713/200 |

OTHER PUBLICATIONS

"SDMI Portable Device Specification, Part 1, Version 1.0", Jul. 8, 1999.*

* cited by examiner

*Primary Examiner*—Hosuk Song
*Assistant Examiner*—Ponnoreay Pich
(74) *Attorney, Agent, or Firm*—Woodcock Washburn LLP

(57) ABSTRACT

A rollback of a clock on a computing device is detected and responded to. A current time from the clock and a stored time from a secure store are obtained and compared to determine whether the obtained current time is earlier than the obtained stored time. If so, a predetermined course of action is taken based on the determination.

20 Claims, 15 Drawing Sheets

| License 16 |
|---|
| Content ID |
| DRL 48 or KD (DRL 48) |
| PU-BB (KD) |
| S (PR-LS) |
| CERT (PU-LS) S (PR-CS) |

Fig. 8

| Digital Content Package 12p |
|---|
| KD (Digital Content 12) |
| Content ID |
| Key ID |
| License Acquisition Info |
| KD (PU-CS) S (PR-CS) |

Fig. 3

DETECTING AND RESPONDING TO A CLOCK ROLLBACK IN A DIGITAL RIGHTS MANAGEMENT SYSTEM ON A COMPUTING DEVICE

CROSS-REFERENCE TO RELATED APPLICATIONS

This application is related to U.S. patent application Ser. No. 09/290,363, filed Apr. 12, 1999 and entitled "ENFORCEMENT ARCHITECTURE AND METHOD FOR DIGITAL RIGHTS MANAGEMENT", and U.S. Provisional Application No. 60/126,614, filed Mar. 27, 1999 and entitled "ENFORCEMENT ARCHITECTURE AND METHOD FOR DIGITAL RIGHTS MANAGEMENT", each of which is hereby incorporated by reference in its entirety.

This application is related to and is filed concurrently with U.S. patent application Ser. No. 09/797,017, entitled "SPECIFYING RIGHTS IN A DIGITAL RIGHTS LICENSE ACCORDING TO EVENTS" and hereby incorporated by reference in its entirety.

TECHNICAL FIELD

The present invention relates to an architecture for enforcing rights in digital content. More specifically, the present invention relates to such an enforcement architecture that allows access to encrypted digital content only in accordance with parameters specified by license rights acquired by a user of the digital content. Even more specifically, the present invention relates to an event detection mechanism for detecting a change in a system value counter to that which is expected, such as for example a rolled-back clock, where the changing system value is referred to in the course of evaluating license rights.

BACKGROUND OF THE INVENTION

Digital rights management and enforcement is highly desirable in connection with digital content such as digital audio, digital video, digital text, digital data, digital multimedia, etc., where such digital content is to be distributed to users. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

Typically, a content owner or rights-owner, such as an author, a publisher, a broadcaster, etc. (hereinafter "content owner"), wishes to distribute such digital content to a user or recipient in exchange for a license fee or some other consideration. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

However, after distribution has occurred, such content owner has very little if any control over the digital content. This is especially problematic in view of the fact that practically every new or recent personal computer includes the software and hardware necessary to make an exact digital copy of such digital content, and to download such exact digital copy to a write-able magnetic or optical disk, or to send such exact digital copy over a network such as the Internet to any destination.

Of course, as part of the legitimate transaction where the license fee was obtained, the content owner may require the user of the digital content to promise not to re-distribute such digital content. However, such a promise is easily made and easily broken. A content owner may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing an enforcement architecture and method that allows the controlled rendering or playing of arbitrary forms of digital content, where such control is flexible and definable by the content owner of such digital content. A need also exists for providing a controlled rendering environment on a computing device such as a personal computer, where the rendering environment includes at least a portion of such enforcement architecture. Such controlled rendering environment allows that the digital content will only be rendered as specified by the content owner, even though the digital content is to be rendered on a computing device which is not under the control of the content owner.

Further, a need exists for a trusted component running on the computing device, where the trusted component enforces the rights of the content owner on such computing device in connection with a piece of digital content, even against attempts by the user of such computing device to access such digital content in ways not permitted by the content owner. As but one example, such a trusted software component prevents a user of the computing device from making a copy of such digital content, except as otherwise allowed for by the content owner thereof.

SUMMARY OF THE INVENTION

The aforementioned needs are satisfied at least in part by an enforcement architecture and method for digital rights management, where the architecture and method enforce rights in protected (secure) digital content available on a medium such as the Internet, an optical disk, etc. For purposes of making content available, the architecture includes a content server from which the digital content is accessible over the Internet or the like in an encrypted form. The content server may also supply the encrypted digital content for recording on an optical disk or the like, wherein the encrypted digital content may be distributed on the optical disk itself. At the content server, the digital content is encrypted using an encryption key, and public/private key techniques are employed to bind the digital content with a digital license at the user's computing device or client machine.

When a user attempts to render the digital content on a computing device, the rendering application invokes a Digital Rights Management (DRM) system on such user's computing device. If the user is attempting to render the digital content for the first time, the DRM system either directs the user to a license server to obtain a license to render such digital content in the manner sought, or transparently obtains such license from such license server without any action necessary on the part of the user. The license includes:

a decryption key (KD) that decrypts the encrypted digital content;

a description of the rights (play, copy, etc.) conferred by the license and related conditions (begin date, expiration date, number of plays, etc.), where such description is in a digitally readable form; and a digital signature that ensures the integrity of the license.

The user should not be able to decrypt and render the encrypted digital content without obtaining such a license from the license server. The obtained license is stored in a license store in the user's computing device.

Importantly, the license server only issues a license to a DRM system that is 'trusted' (i.e., that can authenticate itself). To implement 'trust', the DRM system is equipped with a 'black box' that performs decryption and encryption functions for such DRM system. The black box includes a public/private key pair, a version number and a unique signature, all as provided by an approved certifying authority. The public key is made available to the license server for purposes of encrypting portions of the issued license, thereby binding such license to such black box. The private key is available to the black box only, and not to the user or anyone else, for purposes of decrypting information encrypted with the corresponding public key. The DRM system is initially provided with a black box with a public/private key pair, and the user is prompted to download from a black box server an updated secure black box when the user first requests a license. The black box server provides the updated black box, along with a unique public/private key pair. Such updated black box is written in unique executable code that will run only on the user's computing device, and is re-updated on a regular basis.

When a user requests a license, the client machine sends the black box public key, version number, and signature to the license server, and such license server issues a license only if the version number is current and the signature is valid. A license request also includes an identification of the digital content for which a license is requested and a key ID that identifies the decryption key associated with the requested digital content. The license server uses the black box public key to encrypt the decryption key, and the decryption key to encrypt the license terms, then downloads the encrypted decryption key and encrypted license terms to the user's computing device along with a license signature.

Once the downloaded license has been stored in the DRM system license store, the user can render the digital content according to the rights conferred by the license and specified in the license terms. When a request is made to render the digital content, the black box is caused to decrypt the decryption key and license terms, and a DRM system license evaluator evaluates such license terms. The black box decrypts the encrypted digital content only if the license evaluation results in a decision that the requestor is allowed to play such content. The decrypted content is provided to the rendering application for rendering.

In the present invention, a rollback of a clock on a computing device is detected and responded to. A current time from the clock and a stored time from a secure store are obtained and compared to determine whether the obtained current time is earlier than the obtained stored time. If so, a predetermined course of action is taken based on the determination.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 3 is a block diagram of a digital content package having digital content for use in connection with the architecture of FIG. 1 in accordance with one embodiment of the present invention;

FIG. 8 is a block diagram of a digital license for use in connection with the architecture of FIG. 1 in accordance with one embodiment of the present invention;

DETAILED DESCRIPTION OF THE INVENTION

Figure 1:
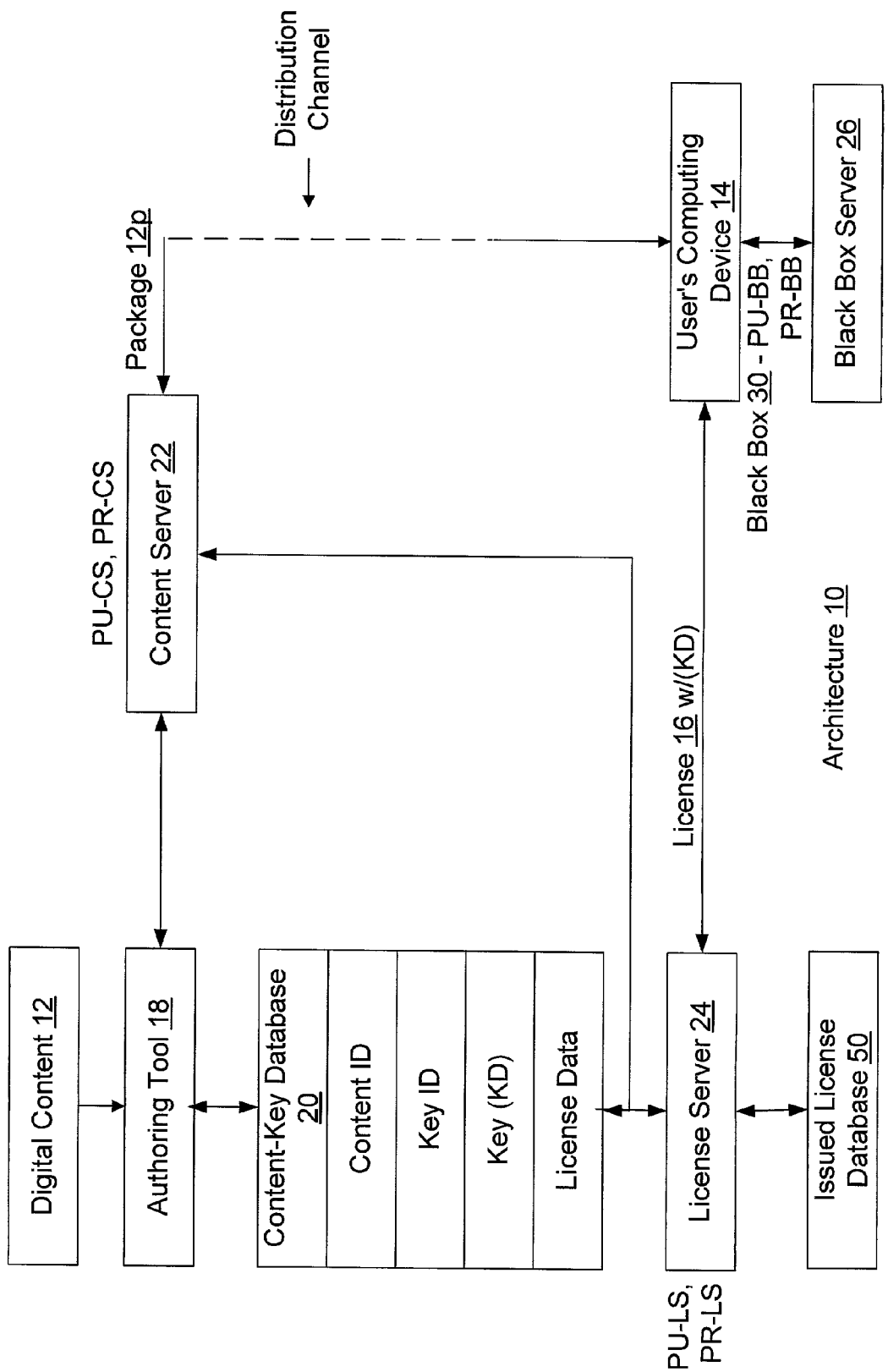
FIG. 1 is a block diagram showing an enforcement architecture in accordance with one embodiment of the present invention.

Referring to the drawings in details, wherein like numerals are used to indicate like elements throughout, there is shown in FIG. 1 an enforcement architecture 10 in accordance with one embodiment of the present invention. Overall, the enforcement architecture 10 allows an owner of digital content 12 to specify license rules that must be satisfied before such digital content 12 is allowed to be rendered on a user's computing device 14. Such license rules are embodied within a digital license 16 that the user/user's computing device 14 (hereinafter, such terms are interchangeable unless circumstances require otherwise) must obtain from the content owner or an agent thereof. The digital content 12 is distributed in an encrypted form, and may be distributed freely and widely. Preferably, the decrypting key (KD) for decrypting the digital content 12 is included with the license 16.

Computer Environment

Figure 12:
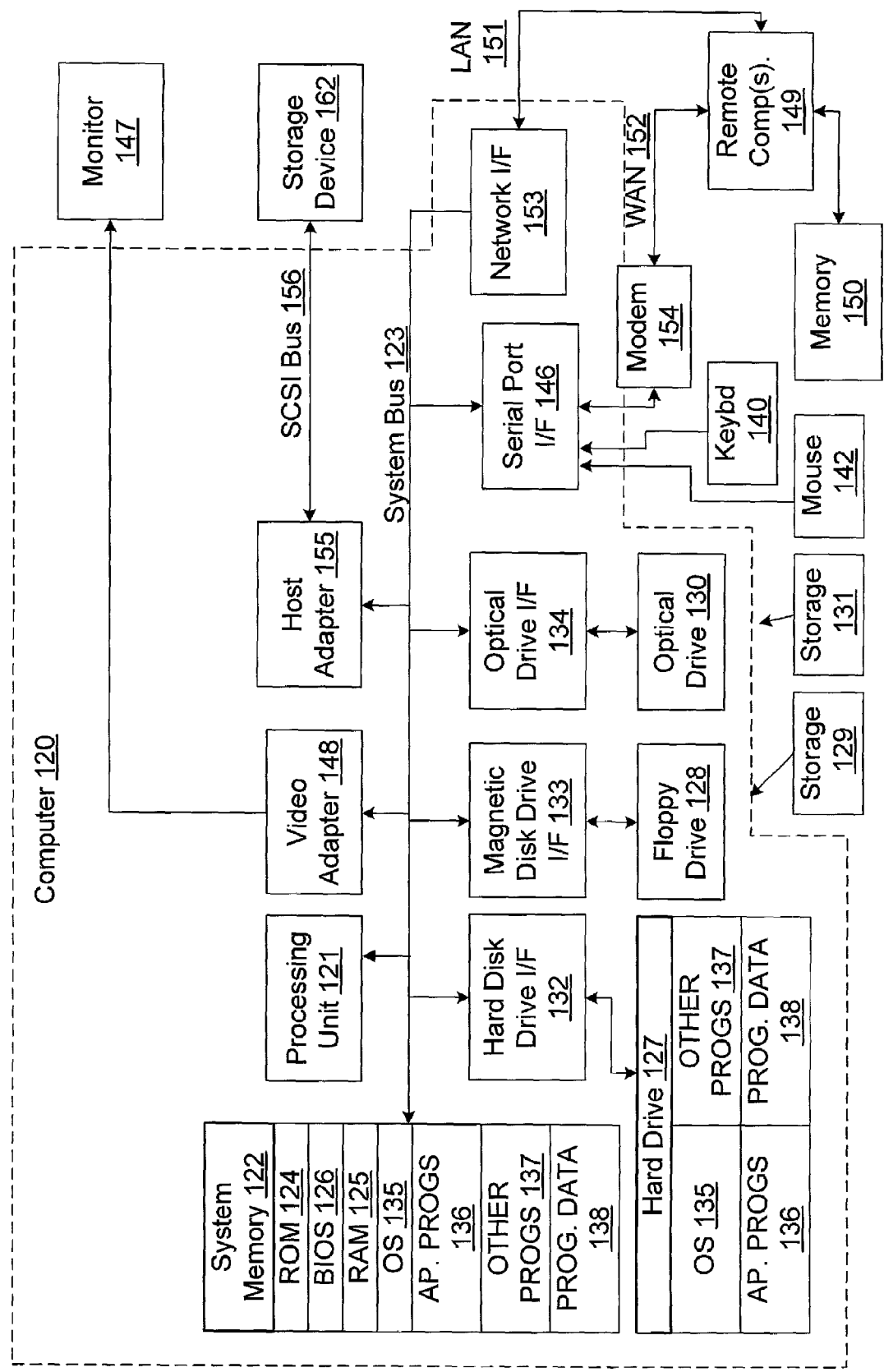
FIG. 12 is a block diagram representing a general purpose computer system in which aspects of the present invention and/or portions thereof may be incorporated.

FIG. 12 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 12, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 12 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 12. The logical connections depicted in FIG. 12 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Architecture

Referring again to FIG. 1, in one embodiment of the present invention, the architecture 10 includes an authoring tool 18, a content-key database 20, a content server 22, a license server 24, and a black box server 26, as well as the aforementioned user's computing device 14.

Architecture—Authoring Tool 18

The authoring tool 18 is employed by a content owner to package a piece of digital content 12 into a form that is amenable for use in connection with the architecture 10 of the present invention. In particular, the content owner provides the authoring tool 18 with the digital content 12, instructions and/or rules that are to accompany the digital content 12, and instructions and/or rules as to how the digital content 12 is to be packaged. The authoring tool 18 then produces a digital content package 12p having the digital content 12 encrypted according to an encryption/decryption key, and the instructions and/or rules that accompany the digital content 12.

In one embodiment of the present invention, the authoring tool 18 is instructed to serially produce several different digital content 12 packages 12p, each having the same digital content 12 encrypted according to a different encryption/decryption key. As should be understood, having several different packages 12p with the same digital content 12 may be useful for tracking the distribution of such packages 12p/content 12 (hereinafter simply "digital content 12", unless circumstances require otherwise). Such distribution tracking is not ordinarily necessary, but may be used by an investigative authority in cases where the digital content 12 has been illegally sold or broadcast.

In one embodiment of the present invention, the encryption/decryption key that encrypts the digital content 12 is a symmetric key, in that the encryption key is also the decryption key (KD). As will be discussed below in more detail, such decryption key (KD) is delivered to a user's computing device 14 in a hidden form as part of a license 16 for such digital content 12. Preferably, each piece of digital content 12 is provided with a content ID (or each package 12p is provided with a package ID), each decryption key (KD) has a key ID, and the authoring tool 18 causes the decryption key (KD), key ID, and content ID (or package ID) for each piece of digital content 12 (or each package 12p) to be stored in the content-key database 20. In addition, license data regarding the types of licenses 16 to be issued for the digital content 12 and the terms and conditions for each type of license 16 may be stored in the content-key database 20, or else in another database (not shown). Preferably, the license data can be modified by the content owner at a later time as circumstances and market conditions may require.

In use, the authoring tool 18 is supplied with information including, among other things:

the digital content 12 to be packaged;

the type and parameters of watermarking and/or fingerprinting to be employed, if any;

the type and parameters of data compression to be employed, if any;

the type and parameters of encryption to be employed;

the type and parameters of serialization to be employed, if any; and the instructions and/or rules that are to accompany the digital content 12.

As is known, a watermark is a hidden, computer-readable signal that is added to the digital content 12 as an identifier. A fingerprint is a watermark that is different for each instance. As should be understood, an instance is a version of the digital content 12 that is unique. Multiple copies of any instance may be made, and any copy is of a particular instance. When a specific instance of digital content 12 is illegally sold or broadcast, an investigative authority can perhaps identify suspects according to the watermark/fingerprint added to such digital content 12.

Data compression may be performed according to any appropriate compression algorithm without departing from the spirit and scope of the present invention. For example, the .mp3 or .wav compression algorithm may be employed. Of course, the digital content 12 may already be in a compressed state, in which case no additional compression is necessary.

The instructions and/or rules that are to accompany the digital content 12 may include practically any appropriate instructions, rules, or other information without departing from the spirit and scope of the present invention. As will be discussed below, such accompanying instructions/rules/information are primarily employed by the user and the user's computing device 14 to obtain a license 16 to render the digital content 12. Accordingly, such accompanying instructions/rules/information may include an appropriately formatted license acquisition script or the like, as will be described in more detail below. In addition, or in the alternative, such accompanying instructions/rules/information may include 'preview' information designed to provide a user with a preview of the digital content 12.

With the supplied information, the authoring tool 18 then produces one or more packages 12p corresponding to the digital content 12. Each package 12p may then be stored on the content server 22 for distribution to the world.

Figure 2:
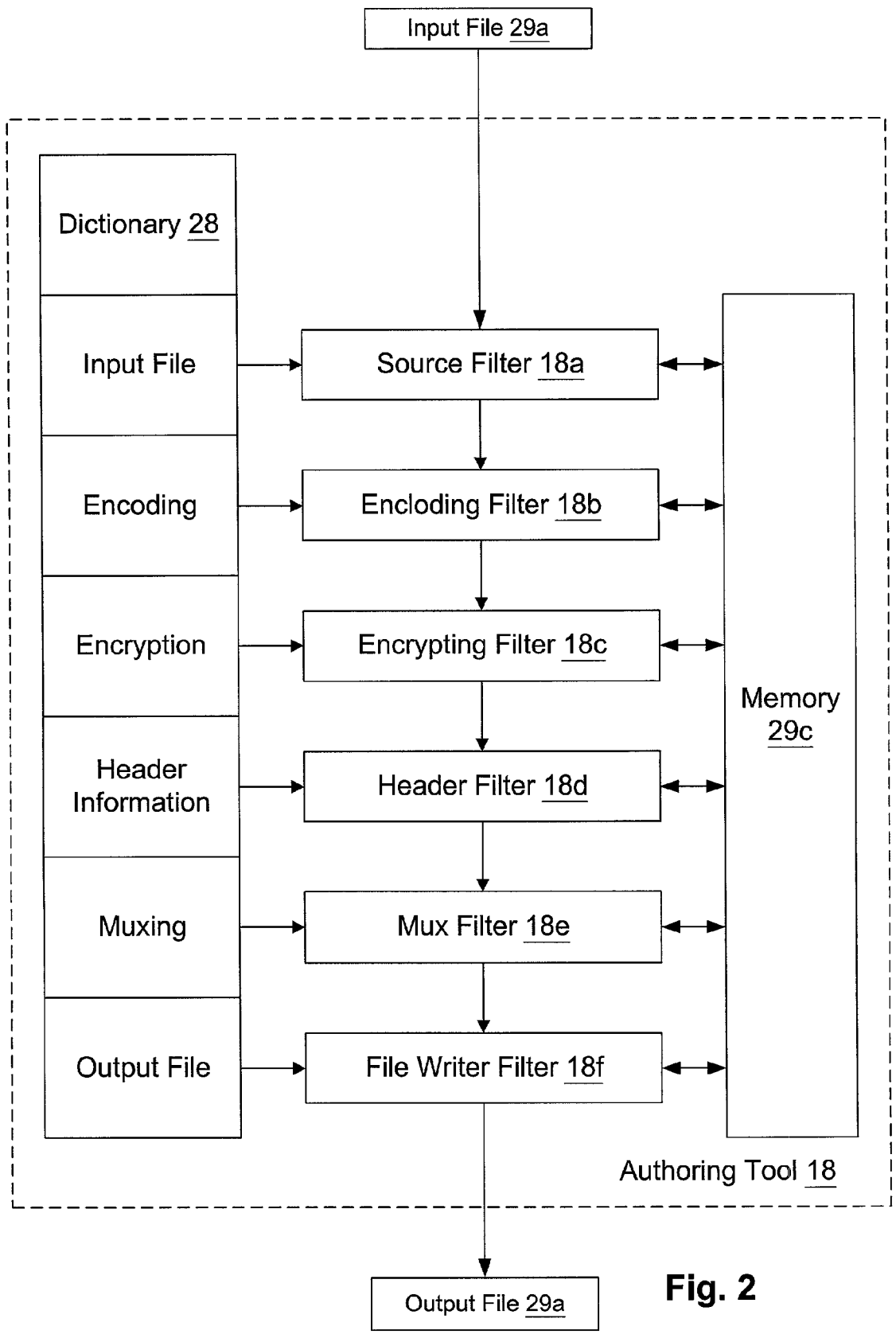
FIG. 2 is a block diagram of the authoring tool of the architecture of FIG. 1 in accordance with one embodiment of the present invention.

In one embodiment of the present invention, and referring now to FIG. 2, the authoring tool 18 is a dynamic authoring tool 18 that receives input parameters which can be specified and operated on. Accordingly, such authoring tool 18 can rapidly produce multiple variations of package 12p for multiple pieces of digital content 12. Preferably, the input parameters are embodied in the form of a dictionary 28, as shown, where the dictionary 28 includes such parameters as:

the name of the input file 29a having the digital content 12;

the type of encoding that is to take place the encryption/decryption key (KD) to be employed, the accompanying instructions/rules/information ('header information') to be packaged with the digital content 12 in the package 12p.

the type of muxing that is to occur; and the name of the output file 29b to which the package 12p based on the digital content 12 is to be written.

As should be understood, such dictionary 28 is easily and quickly modifiable by an operator of the authoring tool 18 (human or machine), and therefore the type of authoring performed by the authoring tool 18 is likewise easily and quickly modifiable in a dynamic manner. In one embodiment of the present invention, the authoring tool 18 includes an operator interface (not shown) displayable on a computer screen to a human operator. Accordingly, such operator may modify the dictionary 28 by way of the interface, and further may be appropriately aided and/or restricted in modifying the dictionary 28 by way of the interface.

In the authoring tool 18, and as seen in FIG. 2, a source filter 18a receives the name of the input file 29a having the digital content 12 from the dictionary 28, and retrieves such digital content 12 from such input file and places the digital content 12 into a memory 29*c* such as a RAM or the like. An encoding filter 18*b* then performs encoding on the digital content 12 in the memory 29*c* to transfer the file from the input format to the output format according to the type of encoding specified in the dictionary 28 (i.e., .wav to .asp, .mp3 to asp, etc.), and places the encoded digital content 12 in the memory 29*c*. As shown, the digital content 12 to be packaged (music, e.g.) is received in a compressed format such as the .wav or .mp3 format, and is transformed into a format such as the .asp (active streaming protocol) format. Of course, other input and output formats may be employed without departing from the spirit and scope of the present invention.

Thereafter, an encryption filter 18*c* encrypts the encoded digital content 12 in the memory 29*c* according to the encryption/decryption key (KD) specified in the dictionary 28, and places the encrypted digital content 12 in the memory 29*c*. A header filter 18*d* then adds the header information specified in the dictionary 28 to the encrypted digital content 12 in the memory 29*c*.

As should be understood, depending on the situation, the package 12*p* may include multiple streams of temporally aligned digital content 12 (one stream being shown in FIG. 2), where such multiple streams are multiplexed (i.e., 'muxed'). Accordingly, a mux filter 18*e* performs muxing on the header information and encrypted digital content 12 in the memory 29*c* according to the type of muxing specified in the dictionary 28, and places the result in the memory 29*c*. A file writer filter 18*f* then retrieves the result from the memory 29*c* and writes such result to the output file 29*b* specified in the dictionary 28 as the package 12*p*.

It should be noted that in certain circumstances, the type of encoding to be performed will not normally change. Since the type of muxing typically is based on the type of encoding, it is likewise the case that the type of muxing will not normally change, either. If this is in fact the case, the dictionary 28 need not include parameters on the type of encoding and/or the type of muxing. Instead, it is only necessary that the type of encoding be 'hardwired' into the encoding filter and/or that the type of muxing be 'hardwired' into the mux filter. Of course, as circumstance require, the authoring tool 18 may not include all of the aforementioned filters, or may include other filters, and any included filter may be hardwired or may perform its function according to parameters specified in the dictionary 28, all without departing from the spirit and scope of the present invention.

Preferably, the authoring tool 18 is implemented on an appropriate computer, processor, or other computing machine by way of appropriate software. The structure and operation of such machine and such software should be apparent based on the disclosure herein and therefore do not require any detailed discussion in the present disclosure.

Architecture—Content Server 22

Referring again to FIG. 1, in one embodiment of the present invention, the content server 22 distributes or otherwise makes available for retrieval the packages 12*p* produced by the authoring tool 18. Such packages 12*p* may be distributed as requested by the content server 22 by way of any appropriate distribution channel without departing from the spirit and scope of the present invention. For example, such distribution channel may be the Internet or another network, an electronic bulletin board, electronic mail, or the like. In addition, the content server 22 may be employed to copy the packages 12*p* onto magnetic or optical disks or other storage devices, and such storage devices may then be distributed.

It will be appreciated that the content server 22 distributes packages 12*p* without regard to any trust or security issues. As discussed below, such issues are dealt with in connection with the license server 24 and the relationship between such license server 24 and the user's computing device 14. In one embodiment of the present invention, the content server 22 freely releases and distributes packages 12*p* having digital content 12 to any distributee requesting same. However, the content server 22 may also release and distribute such packages 12*p* in a restricted manner without departing from the spirit and scope of the present invention. For example, the content server 22 may first require payment of a predetermined distribution fee prior to distribution, or may require that a distribute identify itself, or may indeed make a determination of whether distribution is to occur based on an identification of the distributee.

In addition, the content server 22 may be employed to perform inventory management by controlling the authoring tool 18 to generate a number of different packages 12*p* in advance to meet an anticipated demand. For example, the server could generate 100 packages 12*p* based on the same digital content 12, and serve each package 12*p* 10 times. As supplies of packages 12*p* dwindle to 20, for example, the content server 22 may then direct the authoring tool 18 to generate 80 additional packages 12*p*, again for example.

Preferably, the content server 22 in the architecture 10 has a unique public/private key pair (PU-CS, PR-CS) that is employed as part of the process of evaluating a license 16 and obtaining a decryption key (KD) for decrypting corresponding digital content 12, as will be explained in more detail below. As is known, a public/private key pair is an asymmetric key, in that what is encrypted in one of the keys in the key pair can only be decrypted by the other of the keys in the key pair. In a public/private key pair encryption system, the public key may be made known to the world, but the private key should always be held in confidence by the owner of such private key. Accordingly, if the content server 22 encrypts data with its private key (PR-CS), it can send the encrypted data out into the world with its public key (PU-CS) for decryption purposes. Correspondingly, if an external device wants to send data to the content server 22 so that only such content server 22 can decrypt such data, such external device must first obtain the public key of the content server 22 (PU-CS) and then must encrypt the data with such public key. Accordingly, the content server 22 (and only the content server 22) can then employ its private key (PR-CS) to decrypt such encrypted data.

As with the authoring tool 18, the content server 22 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention, the authoring tool 18 and the content server 22 may reside on a single computer, processor, or other computing machine, each in a separate work space. It should be recognized, moreover, that the content server 22 may in certain circumstances include the authoring tool 18 and/or perform the functions of the authoring tool 18, as discussed above.

Structure of Digital Content Package 12p

Referring now to FIG. 3, in one embodiment of the present invention, the digital content package 12p as distributed by the content server 22 includes:

the digital content 12 encrypted with the encryption/decryption key (KD), as was discussed above (i.e., (KD (CONTENT)));

the content ID (or package ID) of such digital content 12 (or package 12p);

the key ID of the decryption key (KD);

license acquisition information, preferably in an un-encrypted form; and the key KD encrypting the content server 22 public key (PU-CS), signed by the content server 22 private key (PR-CS) (i.e., (KD (PU-CS) S (PR-CS))).

With regard to (KD (PU-CS) S (PR-CS)), it is to be understood that such item is to be used in connection with validating the digital content 12 and/or package 12p, as will be explained below. Unlike a certificate with a digital signature (see below), the key (PU-CS) is not necessary to get at (KD (PU-CS)). Instead, the key (PU-CS) is obtained merely by applying the decryption key (KD). Once so obtained, such key (PU-CS) may be employed to test the validity of the signature (S (PR-CS)).

It should also be understood that for such package 12p to be constructed by the authoring tool 18, such authoring tool 18 must already possess the license acquisition information and (KD (PU-CS) S (PR-CS)), presumably as header information supplied by the dictionary 28. Moreover, the authoring tool 18 and the content server 22 must presumably interact to construct (KD (PU-CS) S (PR-CS)). Such interaction may for example include the steps of:

the content server 22 sending (PU-CS) to the authoring tool 18;

the authoring tool 18 encrypting (PU-CS) with (KD) to produce (KD (PU-CS));

the authoring tool 18 sending (KD (PU-CS)) to the content server 22;

the content server 22 signing (KD (PU-CS)) with (PR-CS) to produce (KD (PU-CS) S (PR-CS)); and the content server 22 sending (KD (PU-CS) S (PR-CS)) to the authoring tool 18.

Architecture—License Server 24

Referring again to FIG. 1, in one embodiment of the present invention, the license server 24 performs the functions of receiving a request for a license 16 from a user's computing device 14 in connection with a piece of digital content 12, determining whether the user's computing device 14 can be trusted to honor an issued license 16, negotiating such a license 16, constructing such license 16, and transmitting such license 16 to the user's computing device 14. Preferably, such transmitted license 16 includes the decryption key (KD) for decrypting the digital content 12. Such license server 24 and such functions will be explained in more detail below. Preferably, and like the content server 22, the license server 24 in the architecture 10 has a unique public/private key pair (PU-LS, PR-LS) that is employed as part of the process of evaluating a license 16 and obtaining a decryption key (KD) for decrypting corresponding digital content 12, as will be explained in more detail below.

As with the authoring tool 18 and the content server 22, the license server 24 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention the authoring tool 18 and/or the content server 22 may reside on a single computer, processor, or other computing machine together with the license server 24, each in a separate work space.

In one embodiment of the present invention, prior to issuance of a license 16, the license server 24 and the content server 22 enter into an agency agreement or the like, wherein the license server 24 in effect agrees to be the licensing authority for at least a portion of the digital content 12 distributed by the content server 22. As should be understood, one content server 22 may enter into an agency agreement or the like with several license servers 24, and/or one license server 24 may enter into an agency agreement or the like with several content servers 22, all without departing from the spirit and scope of the present invention.

Preferably, the license server 24 can show to the world that it does in fact have the authority to issue a license 16 for digital content 12 distributed by the content server 22. To do so, it is preferable that the license server 24 send to the content server 22 the license server 24 public key (PU-LS), and that the content server 22 then send to the license server 24 a digital certificate containing PU-LS as the contents signed by the content server 22 private key (CERT (PU-LS) S (PR-CS)). As should be understood, the contents (PU-LS) in such certificate can only be accessed with the content server 22 public key (PU-CS). As should also be understood, in general, a digital signature of underlying data is an encrypted form of such data, and will not match such data when decrypted if such data has been adulterated or otherwise modified.

As a licensing authority in connection with a piece of digital content 12, and as part of the licensing function, the license server 24 must have access to the decryption key (KD) for such digital content 12. Accordingly, it is preferable that license server 24 have access to the content-key database 20 that has the decryption key (KD), key ID, and content ID (or package ID) for such digital content 12 (or package 12p).

Architecture—Black Box Server 26

Still referring to FIG. 1, in one embodiment of the present invention, the black box server 26 performs the functions of installing and/or upgrading a new black box 30 in a user's computing device 14. As will be explained in more detail below, the black box 30 performs encryption and decryption functions for the user's computing device 14. As will also be explained in more detail below, the black box 30 is intended to be secure and protected from attack. Such security and protection is provided, at least in part, by upgrading the black box 30 to a new version as necessary by way of the black box server 26, as will be explained in more detail below.

As with the authoring tool 18, the content server 22, and the license server 24, the black box server 26 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention the license server 24, the authoring tool 18, and/or the content server 22 may reside on a single computer, processor, or other computing machine together with the black box server 26, each in a separate work space. Note, though, that for security purposes, it may be wise to have the black box server 26 on a separate machine.

Architecture—User's Computing Device 14

Figure 4:
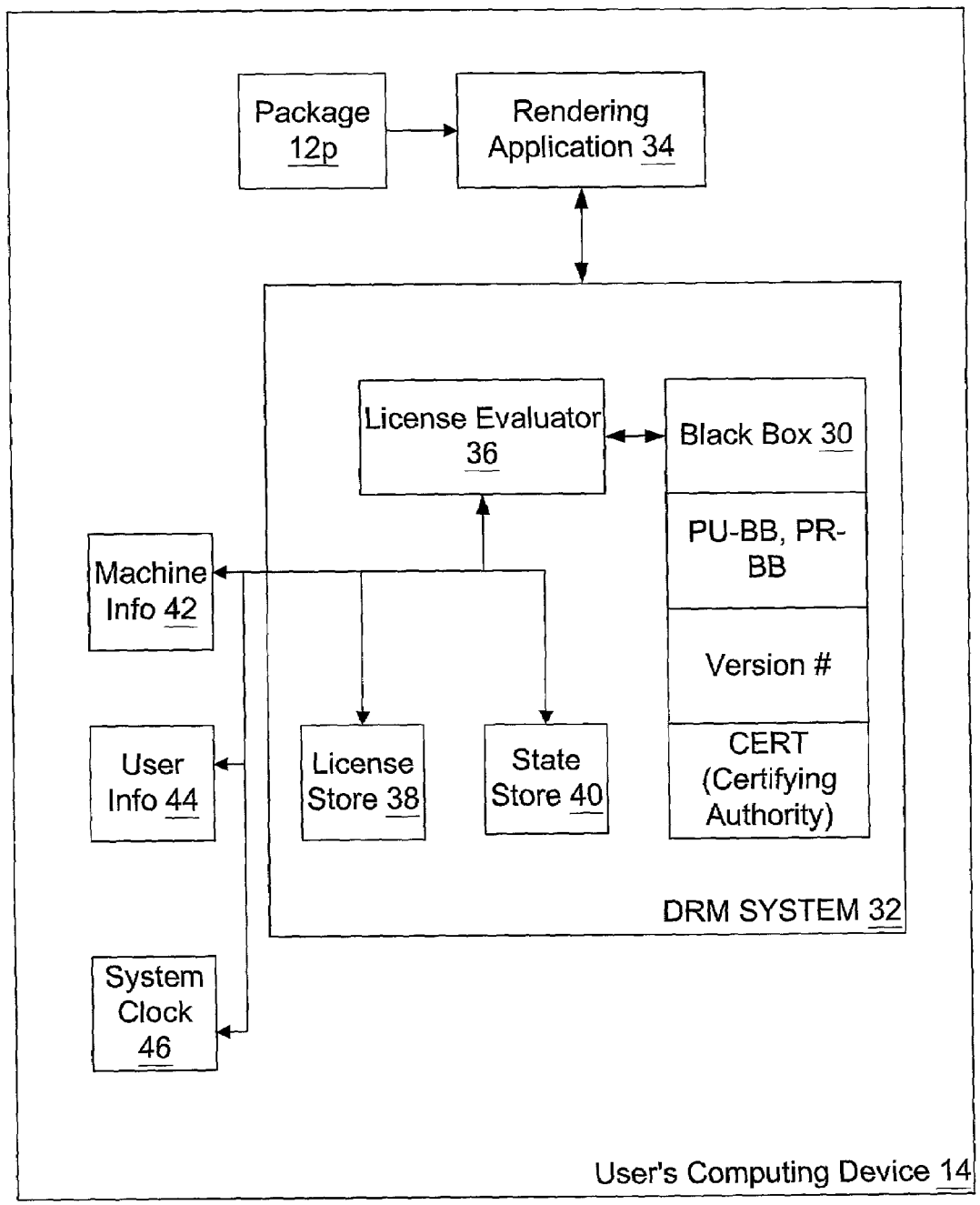
FIG. 4 is a block diagram of the user's computing device of FIG. 1 in accordance with one embodiment of the present invention.

Referring now to FIG. 4, in one embodiment of the present invention, the user's computing device 14 is a personal computer or the like, having elements including a keyboard, a mouse, a screen, a processor, RAM, ROM, a hard drive, a floppy drive, a CD player, and/or the like. However, the user's computing device 14 may also be a dedicated viewing device such as a television or monitor, a dedicated audio device such as a stereo or other music player, a dedicated printer, or the like, among other things, all without departing from the spirit and scope of the present invention.

The content owner for a piece of digital content 12 must trust that the user's computing device 14 will abide by the rules specified by such content owner, i.e. that the digital content 12 will not be rendered unless the user obtains a license 16 that permits the rendering in the manner sought. Preferably, then, the user's computing device 14 must provide a trusted component or mechanism 32 that can satisfy to the content owner that such computing device 14 will not render the digital content 12 except according to the license rules embodied in the license 16 associated with the digital content 12 and obtained by the user.

Here, the trusted mechanism 32 is a Digital Rights Management (DRM) system 32 that is enabled when a user requests that a piece of digital content 12 be rendered, that determines whether the user has a license 16 to render the digital content 12 in the manner sought, that effectuates obtaining such a license 16 if necessary, that determines whether the user has the right to play the digital content 12 according to the license 16, and that decrypts the digital content 12 for rendering purposes if in fact the user has such right according to such license 16. The contents and function of the DRM system 32 on the user's computing device 14 and in connection with the architecture 10 are described below.

DRM System 32

The DRM system 32 performs four main functions with the architecture 10 disclosed herein: (1) content acquisition, (2) license acquisition, (3) content rendering, and (4) black box 30 installation/update. Preferably, any of the functions can be performed at any time, although it is recognized that some of the functions already require that digital content 12 be acquired.

DRM System 32—Content Acquisition

Acquisition of digital content 12 by a user and/or the user's computing device 14 is typically a relatively straightforward matter and generally involves placing a file having encrypted digital content 12 on the user's computing device 14. Of course, to work with the architecture 10 and the DRM system 32 disclosed herein, it is necessary that the encrypted digital content 12 be in a form that is amenable to such architecture 10 and DRM system 32, such as the digital package 12p as will be described below.

As should be understood, the digital content 12 may be obtained in any manner from a content server 22, either directly or indirectly, without departing from the spirit and scope of the present invention. For example, such digital content 12 may be downloaded from a network such as the Internet, located on an obtained optical or magnetic disk or the like, received as part of an E-mail message or the like, or downloaded from an electronic bulletin board or the like.

Such digital content 12, once obtained, is preferably stored in a manner such that the obtained digital content 12 is accessible by a rendering application 34 (to be described below) running on the computing device 14, and by the DRM system 32. For example, the digital content 12 may be placed as a file on a hard drive (not shown) of the user's computing device 14, or on a network server (not shown) accessible to the computing device 14. In the case where the digital content 12 is obtained on an optical or magnetic disk or the like, it may only be necessary that such disk be present in an appropriate drive (not shown) coupled to the user's computing device 14.

In the present invention, it is not envisioned that any special tools are necessary to acquire digital content 12, either from the content server 22 as a direct distribution source or from some intermediary as an indirect distribution source. That is, it is preferable that digital content 12 be as easily acquired as any other data file. However, the DRM system 32 and/or the rendering application 34 may include an interface (not shown) designed to assist the user in obtaining digital content 12. For example, the interface may include a web browser especially designed to search for digital content 12, links to pre-defined Internet web sites that are known to be sources of digital content 12, and the like.

DRM System 32—Content Rendering, Part 1

Figure 5A:
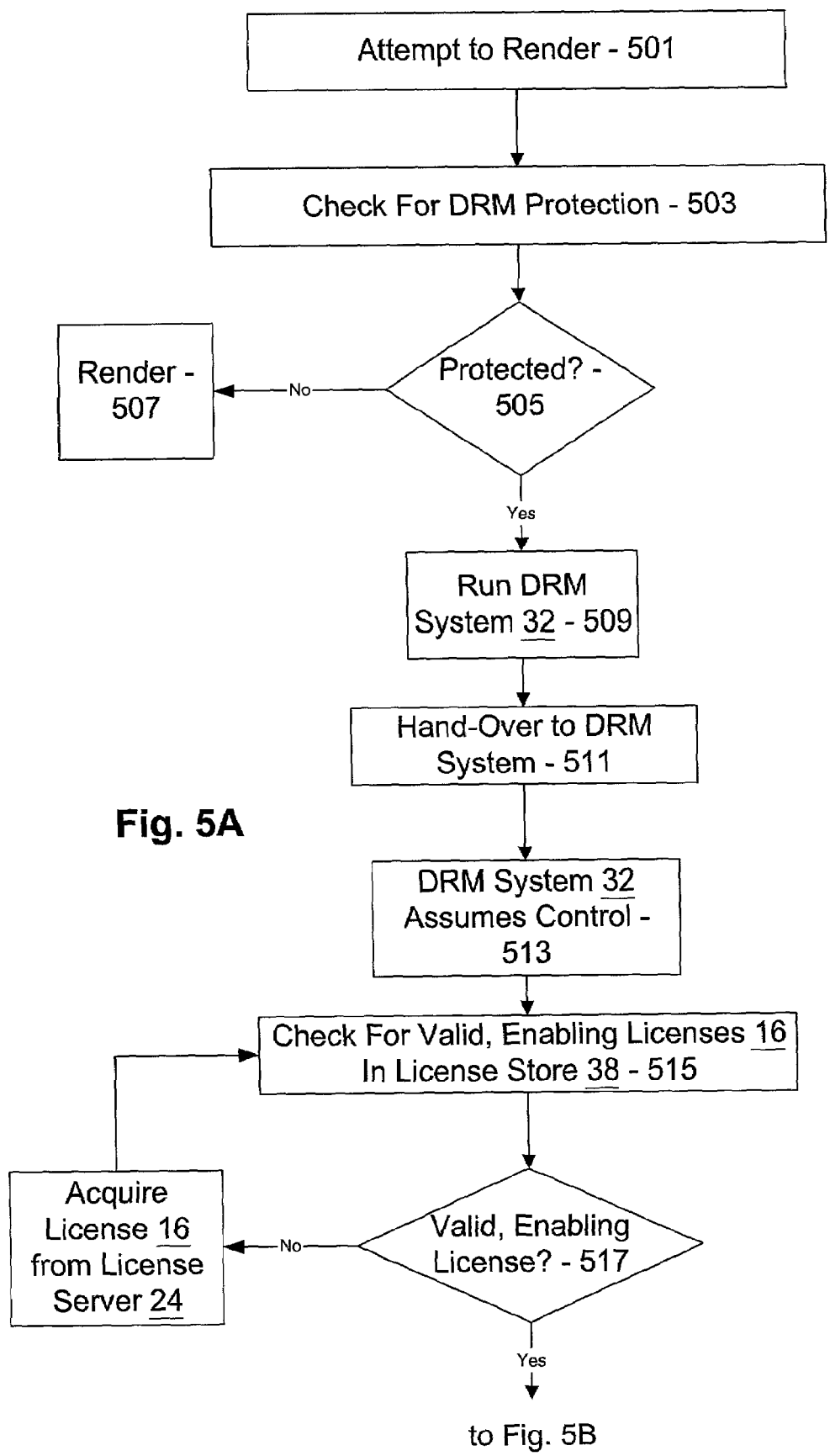
FIGS. 5A and 5B are flow diagrams showing the steps performed in connection with the Digital Rights Management (DRM) system of the computing device of FIG. 4 to render content in accordance with one embodiment of the present invention.

Referring now to FIG. 5A, in one embodiment of the present invention, assuming the encrypted digital content 12 has been distributed to and received by a user and placed by the user on the computing device 14 in the form of a stored file, the user will attempt to render the digital content 12 by executing some variation on a render command (step 501). For example, such render command may be embodied as a request to 'play' or 'open' the digital content 12. In some computing environments, such as for example the "MICROSOFT WINDOWS" operating system, distributed by MICROSOFT Corporation of Redmond, Wash. such play or open command may be as simple as 'clicking' on an icon representative of the digital content 12. Of course, other embodiments of such render command may be employed without departing from the spirit and scope of the present invention. In general, such render command may be considered to be executed whenever a user directs that a file having digital content 12 be opened, run, executed, and/or the like.

Importantly, and in addition, such render command may be embodied as a request to copy the digital content 12 to another form, such as to a printed form, a visual form, an audio form, etc. As should be understood, the same digital content 12 may be rendered in one form, such as on a computer screen, and then in another form, such as a printed document. In the present invention, each type of rendering is performed only if the user has the right to do so, as will be explained below.

In one embodiment of the present invention, the digital content 12 is in the form of a digital file having a file name ending with an extension, and the computing device 14 can determine based on such extension to start a particular kind of rendering application 34. For example, if the file name extension indicates that the digital content 12 is a text file, the rendering application 34 is some form of word processor such as the "MICROSOFT WORD", distributed by MICROSOFT Corporation of Redmond, Wash. Likewise, if the file name extension indicates that the digital content 12 is an audio, video, and/or multimedia file, the rendering application 34 is some form of multimedia player, such as "MICROSOFT MEDIA PLAYER", also distributed by MICROSOFT Corporation of Redmond, Wash.

Of course, other methods of determining a rendering application may be employed without departing from the spirit and scope of the present invention. As but one example, the digital content 12 may contain meta-data in an un-encrypted form (i.e., the aforementioned header information), where the meta-data includes information on the type of rendering application 34 necessary to render such digital content 12.

Preferably, such rendering application 34 examines the digital content 12 associated with the file name and determines whether such digital content 12 is encrypted in a rights-protected form (steps 503, 505). If not protected, the digital content 12 may be rendered without further ado (step 507). If protected, the rendering application 34 determines from the encrypted digital content 12 that the DRM system 32 is necessary to play such digital content 12. Accordingly, such rendering application 34 directs the user's computing device 14 to run the DRM system 32 thereon (step 509). Such rendering application 34 then calls such DRM system 32 to decrypt the digital content 12 (step 511). As will be discussed in more detail below, the DRM system 32 in fact decrypts the digital content 12 only if the user has a valid license 16 for such digital content 12 and the right to play the digital content 12 according to the license rules in the valid license 16. Preferably, once the DRM system 32 has been called by the rendering application 34, such DRM system 32 assumes control from the rendering application 34, at least for purposes of determining whether the user has a right to play such digital content 12 (step 513).

DRM System 32 Components

In one embodiment of the present invention, and referring again to FIG. 4, the DRM system 32 includes a license evaluator 36, the black box 30, a license store 38, and a state store 40.

DRM System 32 Components—License Evaluator 36

The license evaluator 36 locates one or more licenses 16 that correspond to the requested digital content 12, determines whether such licenses 16 are valid, reviews the license rules in such valid licenses 16, and determines based on the reviewed license rules whether the requesting user has the right to render the requested digital content 12 in the manner sought, among other things. As should be understood, the license evaluator 36 is a trusted component in the DRM system 32. In the present disclosure, to be 'trusted' means that the license server 24 (or any other trusting element) is satisfied that the trusted element will carry out the wishes of the owner of the digital content 12 according to the rights description in the license 16, and that a user cannot easily alter such trusted element for any purpose, nefarious or otherwise.

The license evaluator 36 has to be trusted in order to ensure that such license evaluator 36 will in fact evaluate a license 16 properly, and to ensure that such license evaluator 36 has not been adulterated or otherwise modified by a user for the purpose of bypassing actual evaluation of a license 16. Accordingly, the license evaluator 36 is run in a protected or shrouded environment such that the user is denied access to such license evaluator 36. Other protective measures may of course be employed in connection with the license evaluator 36 without departing from the spirit and scope of the present invention.

DRM System 32 Components—Black Box 30

Primarily, and as was discussed above, the black box 30 performs encryption and decryption functions in the DRM system 32. In particular, the black box 30 works in conjunction with the license evaluator 36 to decrypt and encrypt certain information as part of the license evaluation function. In addition, once the license evaluator 36 determines that a user does in fact have the right to render the requested digital content 12 in the manner sought, the black box 30 is provided with a decryption key (KD) for such digital content 12, and performs the function of decrypting such digital content 12 based on such decryption key (KD).

The black box 30 is also a trusted component in the DRM system 32. In particular, the license server 24 must trust that the black box 30 will perform the decryption function only in accordance with the license rules in the license 16, and also trust that such black box 30 will not operate should it become adulterated or otherwise modified by a user for the nefarious purpose of bypassing actual evaluation of a license 16. Accordingly, the black box 30 is also run in a protected or shrouded environment such that the user is denied access to such black box 30. Again, other protective measures may be employed in connection with the black box 30 without departing from the spirit and scope of the present invention. Preferably, and like the content server 22 and license server 24, the black box 30 in the DRM system 32 has a unique public/private key pair (PU-BB, PR-BB) that is employed as part of the process of evaluating the license 16 and obtaining a decryption key (KD) for decrypting the digital content 12, as will be described in more detail below.

DRM System 32 Components—License Store 38

The license store 38 stores licenses 16 received by the DRM system 32 for corresponding digital content 12. The license store 38 itself need not be trusted since the license store 38 merely stores licenses 16, each of which already has trust components built thereinto, as will be described below. In one embodiment of the present invention, the license store 38 is merely a sub-directory of a drive such as a hard disk drive or a network drive. However, the license store 38 may be embodied in any other form without departing from the spirit and scope of the present invention, so long as such license store 38 performs the function of storing licenses 16 in a location relatively convenient to the DRM system 32.

RM System 32 Components—State Store 40

The state store 40 performs the function of maintaining state information corresponding to licenses 16 presently or formerly in the license store 38. Such state information is created by the DRM system 32 and stored in the state store 40 as necessary. For example, if a particular license 16 only allows a pre-determined number of renderings of a piece of corresponding digital content 12, the state store 40 maintains state information on how many renderings have in fact taken place in connection with such license 16. The state store 40 continues to maintain state information on licenses 16 that are no longer in the license store 38 to avoid the situation where it would otherwise be advantageous to delete a license 16 from the license store 38 and then obtain an identical license 16 in an attempt to delete the corresponding state information from the state store 40.

The state store 40 also has to be trusted in order to ensure that the information stored therein is not reset to a state more favorable to a user. Accordingly, the state store 40 is likewise run in a protected or shrouded environment such that the user is denied access to such state store 40. Once again, other protective measures may of course be employed in connection with the state store 40 without departing from the spirit and scope of the present invention. For example, the state store 40 may be stored by the DRM system 32 on the computing device 14 in an encrypted form.

DRM SYSTEM 32—Content Rendering, Part 2

Figure 7:
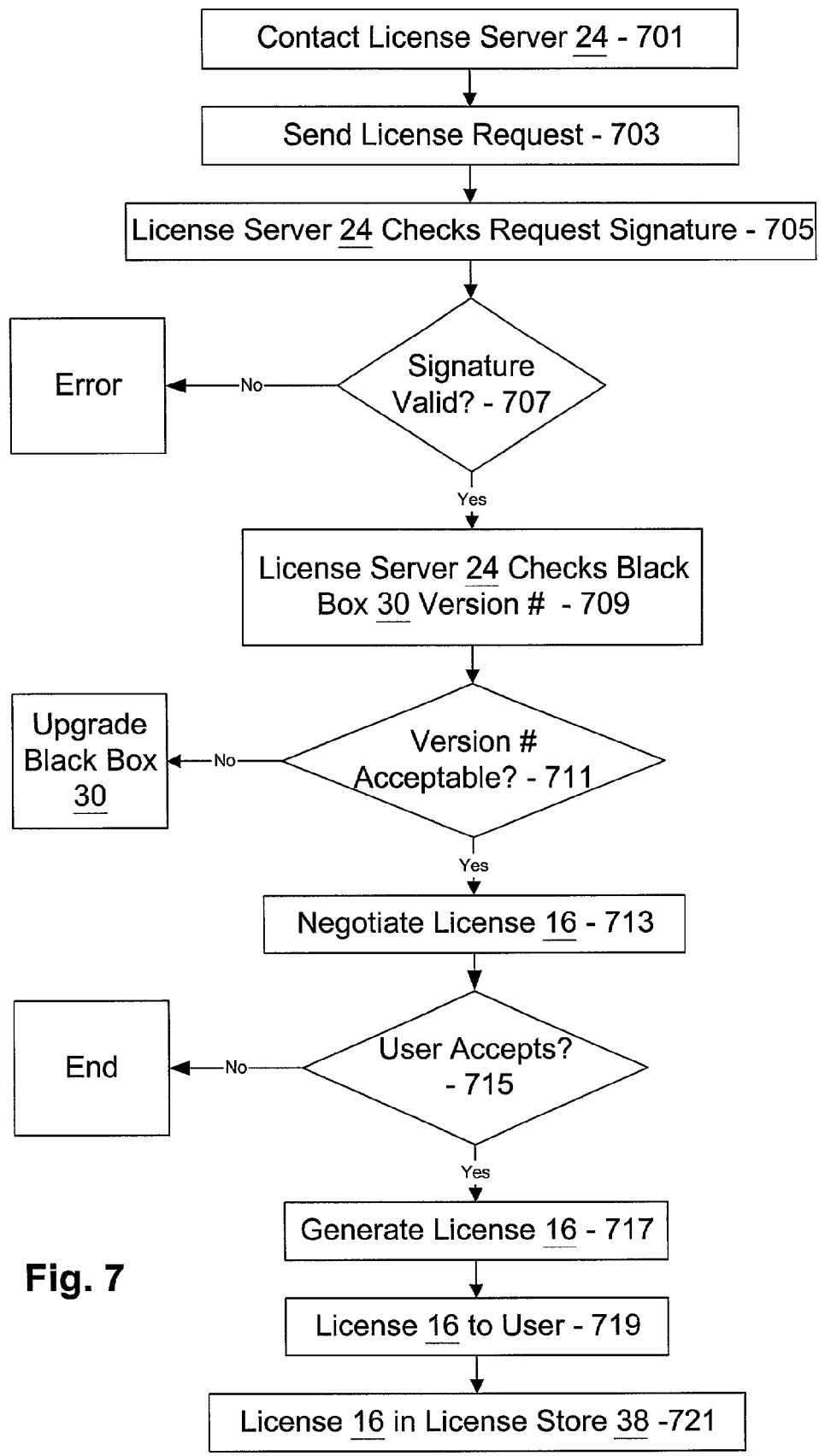
FIG. 7 is a flow diagram showing the steps performed in connection with the DRM system of FIG. 4 to obtain a license in accordance with one embodiment of the present invention.

Referring again to FIG. 5A, and again discussing content rendering in one embodiment of the present invention, once the DRM system 32 has assumed control from the calling rendering application 34, such DRM system 32 then begins the process of determining whether the user has a right to render the requested digital content 12 in the manner sought. In particular, the DRM system 32 either locates a valid, enabling license 16 in the license store (steps 515, 517) or attempts to acquire a valid, enabling license 16 from the license server 24 (i.e. performs the license acquisition function as discussed below and as shown in FIG. 7).

Figure 6:
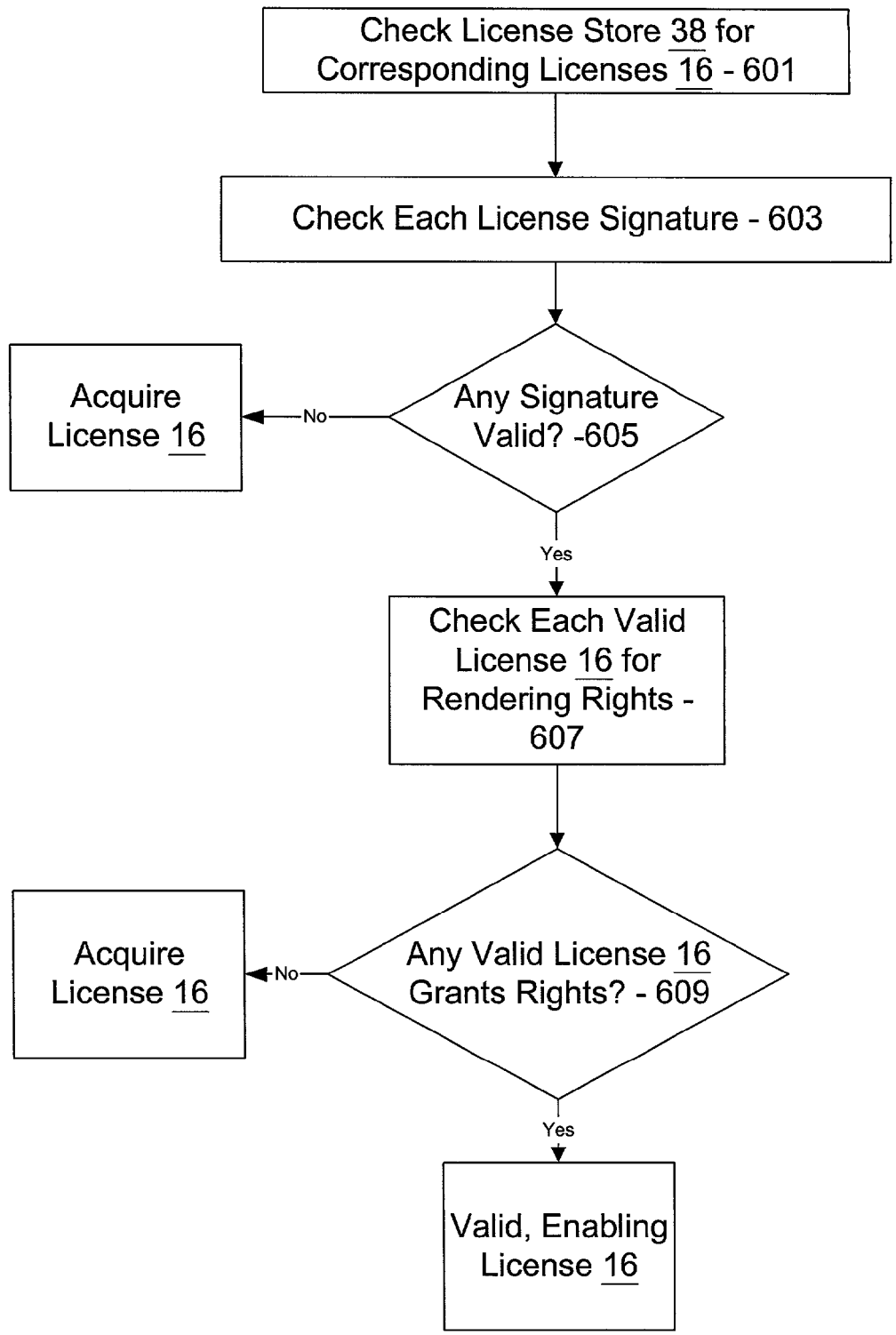
FIG. 6 is a flow diagram showing the steps performed in connection with the DRM system of FIG. 4 to determine whether any valid, enabling licenses are present in accordance with one embodiment of the present invention.

As a first step, and referring now to FIG. 6, the license evaluator 36 of such DRM system 32 checks the license store 38 for the presence of one or more received licenses 16 that correspond to the digital content 12 (step 601). Typically, the license 16 is in the form of a digital file, as will be discussed below, although it will be recognized that the license 16 may also be in other forms without departing from the spirit and scope of the present invention. Typically, the user will receive the digital content 12 without such license 16, although it will likewise be recognized that the digital content 12 may be received with a corresponding license 16 without departing from the spirit and scope of the present invention.

As was discussed above in connection with FIG. 3, each piece of digital content 12 is in a package 12p with a content ID (or package ID) identifying such digital content 12 (or package 12p), and a key ID identifying the decryption key (KD) that will decrypt the encrypted digital content 12. Preferably, the content ID (or package ID) and the key ID are in an un-encrypted form. Accordingly, and in particular, based on the content ID of the digital content 12, the license evaluator 36 looks for any license 16 in the license store 38 that contains an identification of applicability to such content ID. Note that multiple such licenses 16 may be found, especially if the owner of the digital content 12 has specified several different kinds of licenses 16 for such digital content 12, and the user has obtained multiple ones of such licenses 16. If in fact the license evaluator 36 does not find in the license store 38 any license 16 corresponding to the requested digital content 12, the DRM system 32 may then perform the function of license acquisition (step 519 of FIG. 5), to be described below.

Assume now that the DRM system 32 has been requested to render a piece of digital content 12, and one or more licenses 16 corresponding thereto are present in the license store 38. In one embodiment of the present invention, then, the license evaluator 36 of the DRM system 32 proceeds to determine for each such license 16 whether such license 16 itself is valid (steps 603 and 605 of FIG. 6). Preferably, and in particular, each license 16 includes a digital signature 26 based on the content 28 of the license 16. As should be understood, the digital signature 26 will not match the license 16 if the content 28 has been adulterated or otherwise modified. Thus, the license evaluator 36 can determine based on the digital signature 26 whether the content 28 is in the form that it was received from the license server 24 (i.e., is valid). If no valid license 16 is found in the license store 38, the DRM system 32 may then perform the license acquisition function described below to obtain such a valid license 16.

Assuming that one or more valid licenses 16 are found, for each valid license 16, the license evaluator 36 of the DRM system 32 next determines whether such valid license 16 gives the user the right to render the corresponding digital content 12 in the manner desired (i.e., is enabling) (steps 607 and 609). In particular, the license evaluator 36 determines whether the requesting user has the right to play the requested digital content 12 based on the rights description in each license 16 and based on what the user is attempting to do with the digital content 12. For example, such rights description may allow the user to render the digital content 12 into a sound, but not into a decrypted digital copy.

As should be understood, the rights description in each license 16 specifies whether the user has rights to play the digital content 12 based on any of several factors, including who the user is, where the user is located, what type of computing device 14 the user is using, what rendering application 34 is calling the DRM system 32, the date, the time, etc. In addition, the rights description may limit the license 16 to a pre-determined number of plays, or pre-determined play time, for example. In such case, the DRM system 32 must refer to any state information with regard to the license 16, (i.e., how many times the digital content 12 has been rendered, the total amount of time the digital content 12 has been rendered, etc.), where such state information is stored in the state store 40 of the DRM system 32 on the user's computing device 14.

Accordingly, the license evaluator 36 of the DRM system 32 reviews the rights description of each valid license 16 to determine whether such valid license 16 confers the rights sought to the user. In doing so, the license evaluator 36 may have to refer to other data local to the user's computing device 14 to perform a determination of whether the user has the rights sought. As seen in FIG. 4, such data may include an identification 42 of the user's computing device (machine) 14 and particular aspects thereof, an identification 44 of the user and particular aspects thereof, an identification of the rendering application 34 and particular aspects thereof, a system clock 46, and the like. If no valid license 16 is found that provides the user with the right to render the digital content 12 in the manner sought, the DRM system 32 may then perform the license acquisition function described below to obtain such a license 16, if in fact such a license 16 is obtainable.

Of course, in some instances the user cannot obtain the right to render the digital content 12 in the manner requested, because the content owner of such digital content 12 has in effect directed that such right not be granted. For example, the content owner of such digital content 12 may have directed that no license 16 be granted to allow a user to print a text document, or to copy a multimedia presentation into an un-encrypted form. In one embodiment of the present invention, the digital content 12 includes data on what rights are available upon purchase of a license 16, and types of licenses 16 available. However, it will be recognized that the content owner of a piece of digital content 12 may at any time change the rights currently available for such digital content 12 by changing the licenses 16 available for such digital content 12.

DRM SYSTEM 32—License Acquisition

Referring now to FIG. 7, if in fact the license evaluator 36 does not find in the license store 38 any valid, enabling license 16 corresponding to the requested digital content 12, the DRM system 32 may then perform the function of license acquisition. As shown in FIG. 3, each piece of digital content 12 is packaged with information in an un-encrypted form regarding how to obtain a license 16 for rendering such digital content 12 (i.e., license acquisition information).

In one embodiment of the present invention, such license acquisition information may include (among other things) types of licenses 16 available, and one or more Internet web sites or other site information at which one or more appropriate license servers 24 may be accessed, where each such license server 24 is in fact capable of issuing a license 16 corresponding to the digital content 12. Of course, the license 16 may be obtained in other manners without departing from the spirit and scope of the present invention. For example, the license 16 may be obtained from a license server 24 at an electronic bulletin board, or even in person or via regular mail in the form of a file on a magnetic or optical disk or the like.

Assuming that the location for obtaining a license 16 is in fact a license server 24 on a network, the license evaluator 36 then establishes a network connection to such license server 24 based on the web site or other site information, and then sends a request for a license 16 from such connected license server 24 (steps 701, 703). In particular, once the DRM system 32 has contacted the license server 24, such DRM system 32 transmits appropriate license request information 36 to such license server 24. In one embodiment of the present invention, such license 16 request information 36 may include:

the public key of the black box 30 of the DRM system 32 (PU-BB);

the version number of the black box 30 of the DRM system 32;

a certificate with a digital signature from a certifying authority certifying the black box 30 (where the certificate may in fact include the aforementioned public key and version number of the black box 30);

the content ID (or package ID) that identifies the digital content 12 (or package 12p);

the key ID that identifies the decryption key (KD) for decrypting the digital content 12;

the type of license 16 requested (if in fact multiple types are available);

the type of rendering application 34 that requested rendering of the digital content 12;

and/or the like, among other things. Of course, greater or lessor amounts of license 16 request information 36 may be transmitted to the license server 24 by the DRM system 32 without departing from the spirit and scope of the present invention. For example, information on the type of rendering application 34 may not be necessary, while additional information about the user and/or the user's computing device 14 may be necessary.

Once the license server 24 has received the license 16 request information 36 from the DRM system 32, the license server 24 may then perform several checks for trust/authentication and for other purposes. In one embodiment of the present invention, such license server 24 checks the certificate with the digital signature of the certifying authority to determine whether such has been adulterated or otherwise modified (steps 705, 707). If so, the license server 24 refuses to grant any license 16 based on the request information 36. The license server 24 may also maintain a list of known 'bad' users and/or user's computing devices 14, and may refuse to grant any license 16 based on a request from any such bad user and/or bad user's computing device 14 on the list. Such 'bad' list may be compiled in any appropriate manner without departing from the spirit and scope of the present invention.

Based on the received request and the information associated therewith, and particularly based on the content ID (or package ID) in the license request information, the license server 24 can interrogate the content-key database 20 (FIG. 1) and locate a record corresponding to the digital content 12 (or package 12p) that is the basis of the request. As was discussed above, such record contains the decryption key (KD), key ID, and content ID for such digital content 12. In addition, such record may contain license data regarding the types of licenses 16 to be issued for the digital content 12 and the terms and conditions for each type of license 16. Alternatively, such record may include a pointer, link, or reference to a location having such additional information.

As mentioned above, multiple types of licenses 16 may be available. For example, for a relatively small license fee, a license 16 allowing a limited number of renderings may be available. For a relatively greater license fee, a license 16 allowing unlimited renderings until an expiration date may be available. For a still greater license fee, a license 16 allowing unlimited renderings without any expiration date may be available. Practically any type of license 16 having any kind of license terms may be devised and issued by the license server 24 without departing from the spirit and scope of the present invention.

In one embodiment of the present invention, the request for a license 16 is accomplished with the aid of a web page or the like as transmitted from the license server 24 to the user's computing device 14. Preferably, such web page includes information on all types of licenses 16 available from the license server 24 for the digital content 12 that is the basis of the license 16 request.

In one embodiment of the present invention, prior to issuing a license 16, the license server 24 checks the version number of the black box 30 to determine whether such black box 30 is relatively current (steps 709, 711). As should be understood, the black box 30 is intended to be secure and protected from attacks from a user with nefarious purposes (i.e., to improperly render digital content 12 without a license 16, or outside the terms of a corresponding license 16). However, it is to be recognized that no system and no software device is in fact totally secure from such an attack.

As should also be understood, if the black box 30 is relatively current, i.e., has been obtained or updated relatively recently, it is less likely that such black box 30 has been successfully attacked by such a nefarious user. Preferably, and as a matter of trust, if the license server 24 receives a license request with request information 36 including a black box 30 version number that is not relatively current, such license server 24 refuses to issue the requested license 16 until the corresponding black box 30 is upgraded to a current version, as will be described below. Put simply, the license server 24 will not trust such black box 30 unless such black box 30 is relatively current.

In the context of the black box 30 of the present invention, the term 'current' or 'relatively current' may have any appropriate meaning without departing from the spirit and scope of the present invention, consistent with the function of providing trust in the black box 30 based on the age or use thereof. For example, 'current' may be defined according to age (i.e., less than one month old). As an alternative example, 'current' may be defined based on a number of times that the black box 30 has decrypted digital content 12 (i.e., less than 200 instances of decryption). Moreover, 'current' may be based on policy as set by each license server 24, where one license server 24 may define 'current' differently from another license server 24, and a license server 24 may further define 'current' differently depending on the digital content 12 for which a license 16 is requested, or depending on the type of license 16 requested, among other things.

Assuming that the license server 24 is satisfied from the version number of a black box 30 or other indicia thereof that such black box 30 is current, the license server 24 then proceeds to negotiate terms and conditions for the license 16 with the user (step 713). Alternatively, the license server 24 negotiates the license 16 with the user, then satisfies itself from the version number of the black box 30 that such black box 30 is current (i.e., performs step 713, then step 711). Of course, the amount of negotiation varies depending on the type of license 16 to be issued, and other factors. For example, if the license server 24 is merely issuing a paid-up unlimited use license 16, very little need be negotiated. On the other hand, if the license 16 is to be based on such items as varying values, sliding scales, break points, and other details, such items and details may need to be worked out between the license server 24 and the user before the license 16 can be issued.

As should be understood, depending on the circumstances, the license negotiation may require that the user provide further information to the license server 24 (for example, information on the user, the user's computing device 14, etc.). Importantly, the license negotiation may also require that the user and the license server 24 determine a mutually acceptable payment instrument (a credit account, a debit account, a mailed check, etc.) and/or payment method (paid-up immediately, spread over a period of time, etc.), among other things.

Once all the terms of the license 16 have been negotiated and agreed to by both the license server 24 and user (step 715), a digital license 16 is generated by the license server 24 (step 719), where such generated license 16 is based at least in part on the license request, the black box 30 public key (PU-BB), and the decryption key (KD) for the digital content 12 that is the basis of the request as obtained from the content-key database 20. In one embodiment of the present invention, and as seen in FIG. 8, the generated license 16 includes:

the content ID of the digital content 12 to which the license 16 applies;

a Digital Rights License (DRL) 48 (i.e., the rights description or actual terms and conditions of the license 16 written in a predetermined form that the license evaluator 36 can interrogate), perhaps encrypted with the decryption key (KD) (i.e., KD (DRL));

the decryption key (KD) for the digital content 12 encrypted with the black box 30 public key (PU-BB) as receive in the license request (i.e.,(PU-BB (KD));

a digital signature from the license server 24 (without any attached certificate) based on (KD (DRL)) and (PU-BB (KD)) and encrypted with the license server 24 private key (i.e., (S (PR-LS))); and the certificate that the license server 24 obtained previously from the content server 22, such certificate indicating that the license server 24 has the authority from the content server 22 to issue the license 16 (i.e., (CERT (PU-LS) S (PR-CS))).

As should be understood, the aforementioned elements and perhaps others are packaged into a digital file or some other appropriate form. As should also be understood, if the DRL 48 or (PU-BB (KD)) in the license 16 should become adulterated or otherwise modified, the digital signature (S (PR-LS)) in the license 16 will not match and therefore will not validate such license 16. For this reason, the DRL 48 need not necessarily be in an encrypted form (i.e., (KD (DRL)) as mentioned above), although such encrypted form may in some instances be desirable and therefore may be employed without departing from the spirit and scope of the present invention.

Once the digital license 16 has been prepared, such license 16 is then issued to the requestor (i.e., the DRM system 32 on the user's computing device 14) (step 719 of FIG. 7). Preferably, the license 16 is transmitted over the same path through which the request therefor was made (i.e., the Internet or another network), although another path may be employed without departing from the spirit and scope of the present invention. Upon receipt, the requesting DRM system 32 preferably automatically places the received digital license 16 in the license store 38 (step 721).

It is to be understood that a user's computing device 14 may on occasion malfunction, and licenses 16 stored in the license store 38 of the DRM system 32 on such user's computing device 14 may become irretrievably lost. Accordingly, it is preferable that the license server 24 maintain a database 50 of issued licenses 16 (FIG. 1), and that such license server 24 provide a user with a copy or re-issue (hereinafter 're-issue') of an issued license 16 if the user is in fact entitled to such re-issue. In the aforementioned case where licenses 16 are irretrievably lost, it is also likely the case that state information stored in the state store 40 and corresponding to such licenses 16 is also lost. Such lost state information should be taken into account when re-issuing a license 16. For example, a fixed number of renderings license 16 might legitimately be re-issued in a pro-rated form after a relatively short period of time, and not re-issued at all after a relatively longer period of time.

DRM System 32—Installation/Upgrade of Black Box 30

As was discussed above, as part of the function of acquiring a license 16, the license server 24 may deny a request for a license 16 from a user if the user's computing device 14 has a DRM system 32 with a black box 30 that is not relatively current, i.e., has a relatively old version number. In such case, it is preferable that the black box 30 of such DRM system 32 be upgraded so that the license acquisition function can then proceed. Of course, the black box 30 may be upgraded at other times without departing from the spirit and scope of the present invention.

Preferably, as part of the process of installing the DRM system 32 on a user's computing device 14, a non-unique 'lite' version of a black box 30 is provided. Such 'lite' black box 30 is then upgraded to a unique regular version prior to rendering a piece of digital content 12. As should be understood, if each black box 30 in each DRM system 32 is unique, a security breach into one black box 30 cannot easily be replicated with any other black box 30.

Figure 9:
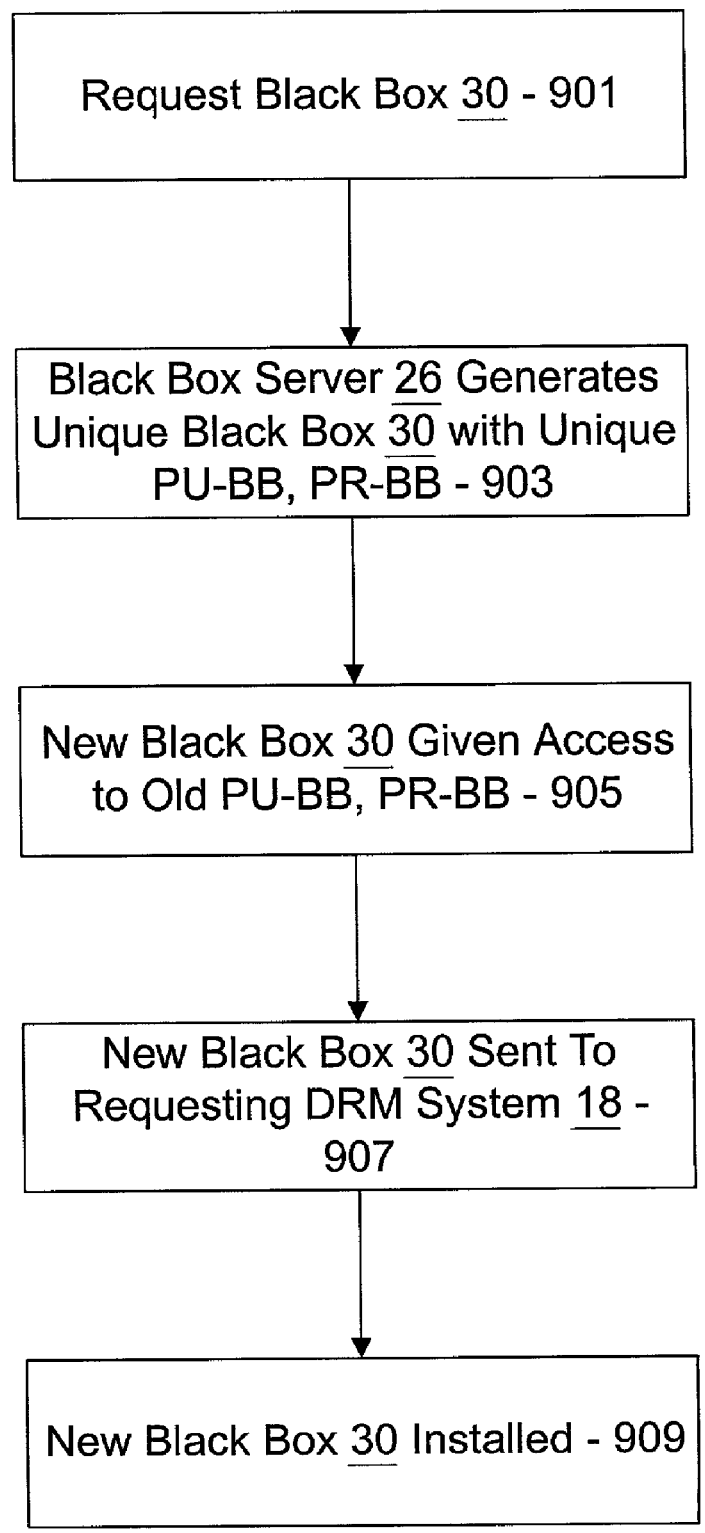
FIG. 9 is a flow diagram showing the steps performed in connection with the DRM system of FIG. 4 to obtain a new black box in accordance with one embodiment of the present invention.

Referring now to FIG. 9, the DRM system 32 obtains the unique black box 30 by requesting same from a black box server 26 or the like (as was discussed above and as shown in FIG. 1) (step 901). Typically, such request is made by way of the Internet, although other means of access may be employed without departing from the spirit and scope of the present invention. For example, the connection to a black box server 26 may be a direct connection, either locally or remotely. An upgrade from one unique non-lite black box 30 to another unique non-lite black box 30 may also be requested by the DRM system 32 at any time, such as for example a time when a license server 24 deems the black box 30 not current, as was discussed above.

Thereafter, the black box server 26 generates a new unique black box 30 (step 903). As seen in FIG. 3, each new black box 30 is provided with a version number and a certificate with a digital signature from a certifying authority. As was discussed above in connection with the license acquisition function, the version number of the black box 30 indicates the relative age and/or use thereof. The certificate with the digital signature from the certifying authority, also discussed above in connection with the license acquisition function, is a proffer or vouching mechanism from the certifying authority that a license server 24 should trust the black box 30. Of course, the license server 24 must trust the certifying authority to issue such a certificate for a black box 30 that is in fact trustworthy. It may be the case, in fact, that the license server 24 does not trust a particular certifying authority, and refuses to honor any certificate issued by such certifying authority. Trust may not occur, for example, if a particular certifying authority is found to be engaging in a pattern of improperly issuing certificates.

Preferably, and as was discussed above, the black box server 26 includes a new unique public/private key pair (PU-BB, PR-BB) with the newly generated unique black box 30 (step 903 of FIG. 9). Preferably, the private key for the black box 30 (PR-BB) is accessible only to such black box 30, and is hidden from and inaccessible by the remainder of the world, including the computing device 14 having the DRM system 32 with such black box 30, and the user thereof.

Most any hiding scheme may be employed without departing from the spirit and scope of the present invention, so long as such hiding scheme in fact performs the function of hiding the private key (PR-BB) from the world. As but one example, the private key (PR-BB) may be split into several sub-components, and each sub-component may be encrypted uniquely and stored in a different location. In such a situation, it is preferable that such sub-components are never assembled in full to produce the entire private key (PR-BB).

In one embodiment of the present invention, such private key (PR-BB) is encrypted according to code-based encryption techniques. In particular, in such embodiment, the actual software code of the black box 30 (or other software code) is employed as encrypting key(s). Accordingly, if the code of the black box 30 (or the other software code) becomes adulterated or otherwise modified, for example by a user with nefarious purposes, such private key (PR-BB) cannot be decrypted.

Although each new black box 30 is delivered with a new public/private key pair (PU-BB, PR-BB), such new black box 30 is also preferably given access to old public/private key pairs from old black boxes 30 previously delivered to the DRM system 32 on the user's computing device 14 (step 905). Accordingly, the upgraded black box 30 can still employ the old key pairs to access older digital content 12 and older corresponding licenses 16 that were generated according to such old key pairs, as will be discussed in more detail below.

Preferably, the upgraded black box 30 delivered by the black box server 26 is tightly tied to or associated with the user's computing device 14. Accordingly, the upgraded black box 30 cannot be operably transferred among multiple computing devices 14 for nefarious purposes or otherwise. In one embodiment of the present invention, as part of the request for the black box 30 (step 901) the DRM system 32 provides hardware information unique to such DRM system 32 and/or unique to the user's computing device 14 to the black box server 26, and the black box server 26 generates a black box 30 for the DRM system 32 based in part on such provided hardware information. Such generated upgraded black box 30 is then delivered to and installed in the DRM system 32 on the user's computing device 14 (steps 907, 909). If the upgraded black box 30 is then somehow transferred to another computing device 14, the transferred black box 30 recognizes that it is not intended for such other computing device 14, and does not allow any requested rendering to proceed on such other computing device 14.

Once the new black box 30 is installed in the DRM system 32, such DRM system 32 can proceed with a license acquisition function or with any other function.

DRM System 32—Content Rendering, Part 3

Figure 5B:
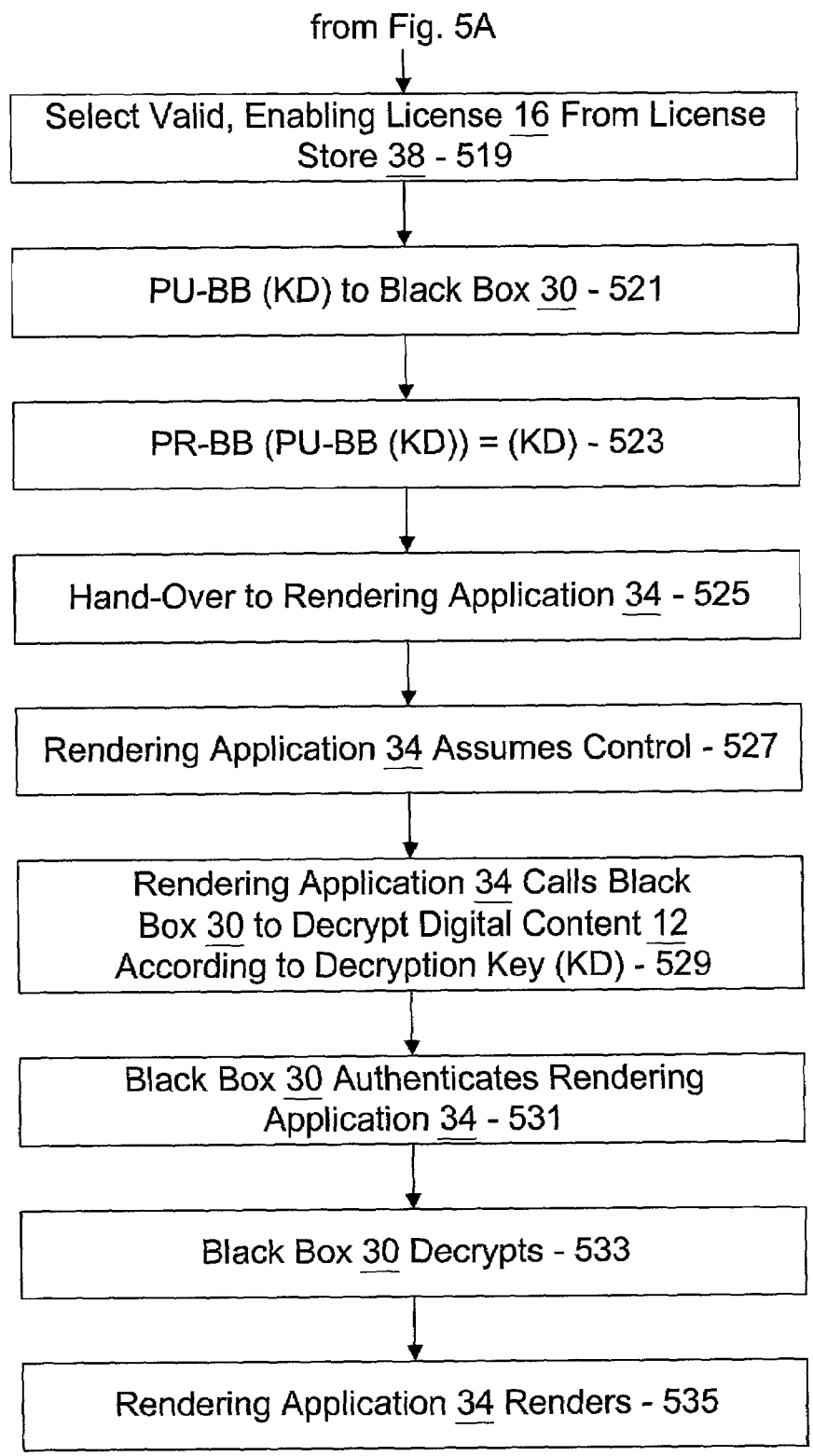

Referring now to FIG. 5B, and assuming, now, that the license evaluator 36 has found at least one valid license 16 and that at least one of such valid licenses 16 provides the user with the rights necessary to render the corresponding digital content 12 in the manner sought (i.e., is enabling), the license evaluator 36 then selects one of such licenses 16 for further use (step 519). Specifically, to render the requested digital content 12, the license evaluator 36 and the black box 30 in combination obtain the decryption key (KD) from such license 16, and the black box 30 employs such decryption key (KD) to decrypt the digital content 12. In one embodiment of the present invention, and as was discussed above, the decryption key (KD) as obtained from the license 16 is encrypted with the black box 30 public key (PU-BB(KD)), and the black box 30 decrypts such encrypted decryption key with its private key (PR-BB) to produce the decryption key (KD) (steps 521, 523). However, other methods of obtaining the decryption key (KD) for the digital content 12 may be employed without departing from the spirit and scope of the present invention.

Once the black box 30 has the decryption key (KD) for the digital content 12 and permission from the license evaluator 36 to render the digital content 12, control may be returned to the rendering application 34 (steps 525, 527). In one embodiment of the present invention, the rendering application 34 then calls the DRM system 32/black box 30 and directs at least a portion of the encrypted digital content 12 to the black box 30 for decryption according to the decryption key (KD) (step 529). The black box 30 decrypts the digital content 12 based upon the decryption key (KD) for the digital content 12, and then the black box 30 returns the decrypted digital content 12 to the rendering application 34 for actual rendering (steps 533, 535). The rendering application 34 may either send a portion of the encrypted digital content 12 or the entire digital content 12 to the black box 30 for decryption based on the decryption key (KD) for such digital content 12 without departing from the spirit and scope of the present invention.

Preferably, when the rendering application 34 sends digital content 12 to the black box 30 for decryption, the black box 30 and/or the DRM system 32 authenticates such rendering application 34 to ensure that it is in fact the same rendering application 34 that initially requested the DRM system 32 to run (step 531). Otherwise, the potential exists that rendering approval may be obtained improperly by basing the rendering request on one type of rendering application 34 and in fact rendering with another type of rendering application 34. Assuming the authentication is successful and the digital content 12 is decrypted by the black box 30, the rendering application 34 may then render the decrypted digital content 12 (steps 533, 535).

Sequence of Key Transactions

Figure 10:
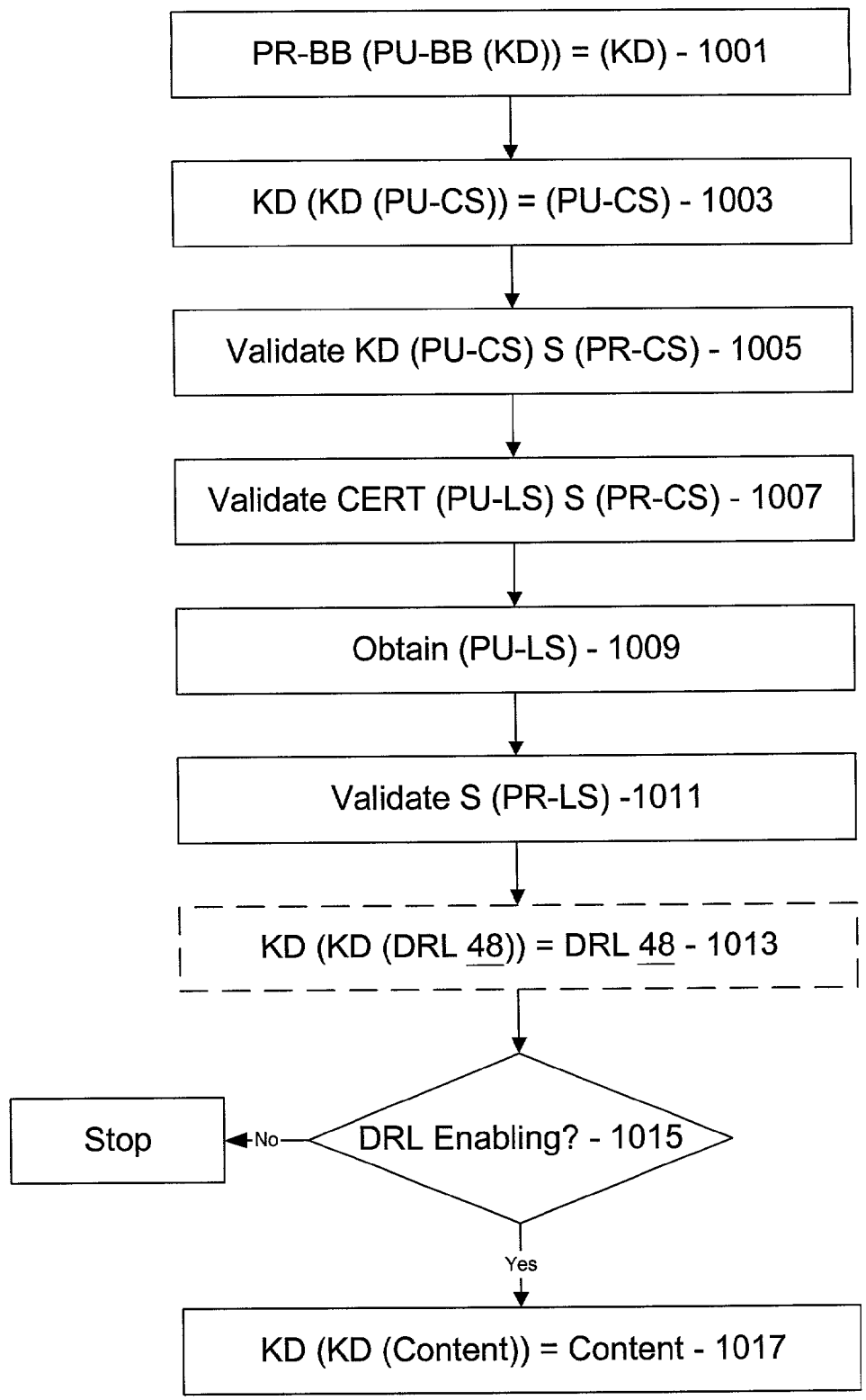
FIG. 10 is a flow diagram showing the key transaction steps performed in connection with the DRM system of FIG. 4 to validate a license and a piece of digital content and render the content in accordance with one embodiment of the present invention.

Referring now to FIG. 10, in one embodiment of the present invention, a sequence of key transactions is performed to obtain the decryption key (KD) and evaluate a license 16 for a requested piece of digital content 12 (i.e., to perform steps 515–523 of FIGS. 5A and 5B). Mainly, in such sequence, the DRM system 32 obtains the decryption key (KD) from the license 16, uses information obtained from the license 16 and the digital content 12 to authenticate or ensure the validity of both, and then determines whether the license 16 in fact provides the right to render the digital content 12 in the manner sought. If so, the digital content 12 may be rendered.

Bearing in mind that each license 16 for the digital content 12, as seen in FIG. 8, includes:

the content ID of the digital content 12 to which the license 16 applies;

the Digital Rights License (DRL) 48, perhaps encrypted with the decryption key (KD) (i.e., KD (DRL));

the decryption key (KD) for the digital content 12 encrypted with the black box 30 public key (PU-BB) (i.e., (PU-BB (KD));

the digital signature from the license server 24 based on (KD (DRL)) and (PU-BB (KD)) and encrypted with the license server 24 private key (i.e., (S (PR-LS))); and the certificate that the license server 24 obtained previously from the content server 22 (i.e., (CERT (PU-LS) S (PR-CS))), and also bearing in mind that the package 12p having the digital content 12, as seen in FIG. 3, includes:

the content ID of such digital content 12;

the digital content 12 encrypted by KD (i.e., (KD(CONTENT)));

a license acquisition script that is not encrypted; and the key KD encrypting the content server 22 public key (PU-CS), signed by the content server 22 private key (PR-CS) (i.e., (KD (PU-CS) S (PR-CS))), in one embodiment of the present invention, the specific sequence of key transactions that are performed with regard to a specific one of the licenses 16 for the digital content 12 is as follows:

1. Based on (PU-BB (KD)) from the license 16, the black box 30 of the DRM system 32 on the user's computing device 14 applies its private key (PR-BB) to obtain (KD) (step 1001). (PR-BB (PU-BB (KD))=(KD)). Note, importantly, that the black box 30 could then proceed to employ KD to decrypt the digital content 12 without any further ado. However, and also importantly, the license server 24 trusts the black box 30 not to do so. Such trust was established at the time such license server 24 issued the license 16 based on the certificate from the certifying authority vouching for the trustworthiness of such black box 30. Accordingly, despite the black box 30 obtaining the decryption key (KD) as an initial step rather than a final step, the DRM system 32 continues to perform all license 16 validation and evaluation functions, as described below.

2. Based on (KD (PU-CS) S (PR-CS)) from the digital content 12, the black box 30 applies the newly obtained decryption key (KD) to obtain (PU-CS) (step 1003). (KD (KD (PU-CS))=(PU-CS)). Additionally, the black box 30 can apply (PU-CS) as against the signature (S (PR-CS)) to satisfy itself that such signature and such digital content 12/package 12p is valid (step 1005). If not valid, the process is halted and access to the digital content 12 is denied.

3. Based on (CERT (PU-LS) S (PR-CS)) from the license 16, the black box 30 applies the newly obtained content server 22 public key (PU-CS) to satisfy itself that the certificate is valid (step 1007), signifying that the license server 24 that issued the license 16 had the authority from the content server 22 to do so, and then examines the certificate contents to obtain (PU-LS) (step 1009). If not valid, the process is halted and access to the digital content 12 based on the license 16 is denied.

4. Based on (S (PR-LS)) from the license 16, the black box 30 applies the newly obtained license server 24 public key (PU-LS) to satisfy itself that the license 16 is valid (step 1011). If not valid, the process is halted and access to the digital content 12 based on the license 16 is denied.

5. Assuming all validation steps are successful, and that the DRL 48 in the license 16 is in fact encrypted with the decryption key (KD), the license evaluator 36 then applies the already-obtained decryption key (KD) to (KD(DRL)) as obtained from the license 16 to obtain the license terms from the license 16 (i.e., the DRL 48) (step 1013). Of course, if the DRL 48 in the license 16 is not in fact encrypted with the decryption key (KD), step 1013 may be omitted. The license evaluator 36 then evaluates/interrogates the DRL 48 and determines whether the user's computing device 14 has the right based on the DRL 48 in the license 16 to render the corresponding digital content 12 in the manner sought (i.e., whether the DRL 48 is enabling) (step 1015). If the license evaluator 36 determines that such right does not exist, the process is halted and access to the digital content 12 based on the license 16 is denied.

6. Finally, assuming evaluation of the license 16 results in a positive determination that the user's computing device 14 has the right based on the DRL 48 terms to render the corresponding digital content 12 in the manner sought, the license evaluator 36 informs the black box 30 that such black box 30 can render the corresponding digital content 12 according to the decryption key (KD). The black box 30 thereafter applies the decryption key (KD) to decrypt the digital content 12 from the package 12p (i.e., (KD(KD (CONTENT))=(CONTENT)) (step 1017).

It is important to note that the above-specified series of steps represents an alternating or 'ping-ponging' between the license 16 and the digital content 12. Such ping-ponging ensures that the digital content 12 is tightly bound to the license 16, in that the validation and evaluation process can only occur if both the digital content 12 and license 16 are present in a properly issued and valid form. In addition, since the same decryption key (KD) is needed to get the content server 22 public key (PU-CS) from the license 16 and the digital content 12 from the package 12p in a decrypted form (and perhaps the license terms (DRL 48) from the license 16 in a decrypted form), such items are also tightly bound. Signature validation also ensures that the digital content 12 and the license 16 are in the same form as issued from the content server 22 and the license server 24, respectively. Accordingly, it is difficult if not impossible to decrypt the digital content 12 by bypassing the license server 24, and also difficult if not impossible to alter and then decrypt the digital content 12 or the license 16.

In one embodiment of the present invention, signature verification, and especially signature verification of the license 16, is alternately performed as follows. Rather than having a signature encrypted by the private key of the license server 16 (PR-LS), as is seen in FIG. 8, each license 16 has a signature encrypted by a private root key (PR-R) (not shown), where the black box 30 of each DRM system 32 includes a public root key (PU-R) (also not shown) corresponding to the private root key (PR-R). The private root key (PR-R) is known only to a root entity, and a license server 24 can only issue licenses 16 if such license server 24 has arranged with the root entity to issue licenses 16.

In particular, in such embodiment:

1. the license server 24 provides its public key (PU-LS) to the root entity;

2. the root entity returns the license server public key (PU-LS) to such license server 24 encrypted with the private root key (PR-R) (i.e., (CERT (PU-LS) S (PR-R))); and 3. the license server 24 then issues a license 16 with a signature encrypted with the license server private key (S (PR-LS)), and also attaches to the license the certificate from the root entity (CERT (PU-LS) S (PR-R)).

For a DRM system 18 to validate such issued license 16, then, the DRM system 18:

1. applies the public root key (PU-R) to the attached certificate (CERT (PU-LS) S (PR-R)) to obtain the license server public key (PU-LS); and 2. applies the obtained license server public key (PU-LS) to the signature of the license 16 (S (PR-LS).

Importantly, it should be recognized that just as the root entity gave the license server 24 permission to issue licenses 16 by providing the certificate (CERT (PU-LS) S (PR-R)) to such license server 24, such license server 24 can provide a similar certificate to a second license server 24 (i.e., (CERT (PU-LS2) S (PR-LS1)), thereby allowing the second license server to also issue licenses 16. As should now be evident, a license 16 issued by the second license server would include a first certificate (CERT (PU-LS1) S (PR-R)) and a second certificate (CERT (PU-LS2) S (PR-LS1)). Likewise, such license 16 is validated by following the chain through the first and second certificates. Of course, additional links in the chain may be added and traversed.

One advantage of the aforementioned signature verification process is that the root entity may periodically change the private root key (PR-R), thereby likewise periodically requiring each license server 24 to obtain a new certificate (CERT (PU-LS) S (PR-R)). Importantly, as a requirement for obtaining such new certificate, each license server may be required to upgrade itself. As with the black box 30, if a license server 24 is relatively current, i.e., has been upgraded relatively recently, it is less likely that license server 24 has been successfully attacked. Accordingly, as a matter of trust, each license server 24 is preferably required to be upgraded periodically via an appropriate upgrade trigger mechanism such as the signature verification process. Of course, other upgrade mechanisms may be employed without departing from the spirit and scope of the present invention.

Of course, if the private root key (PR-R) is changed, then the public root key (PU-R) in each DRM system 18 must also be changed. Such change may for example take place during a normal black box 30 upgrade, or in fact may require that a black box 30 upgrade take place. Although a changed public root key (PU-R) may potentially interfere with signature validation for an older license 16 issued based on an older private root key (PR-R), such interference may be minimized by requiring that an upgraded black box 30 remember all old public root keys (PU-R). Alternatively, such interference may be minimized by requiring signature verification for a license 16 only once, for example the first time such license 16 is evaluated by the license evaluator 36 of a DRM system 18. In such case, state information on whether signature verification has taken place should be compiled, and such state information should be stored in the state store 40 of the DRM system 18.

Digital Rights License 48

In the present invention, the license evaluator 36 evaluates a Digital Rights License (DRL) 48 as the rights description or terms of a license 16 to determine if such DRL 48 allows rendering of a corresponding piece of digital content 12 in the manner sought. In one embodiment of the present invention, the DRL 48 may be written by a licensor (i.e., the content owner) in any DRL language.

As should be understood, there are a multitude of ways to specify a DRL 48. Accordingly, a high degree of flexibility must be allowed for in any DRL language. However, it is impractical to specify all aspects of a DRL 48 in a particular license language, and it is highly unlikely that the author of such a language can appreciate all possible licensing aspects that a particular digital licensor may desire. Moreover, a highly sophisticated license language may be unnecessary and even a hindrance for a licensor providing a relatively simple DRL 48. Nevertheless, a licensor should not be unnecessarily restricted in how to specify a DRL 48. At the same time, the license evaluator 36 should always be able to get answers from a DRL 48 regarding a number of specific license questions.

Figure 11:
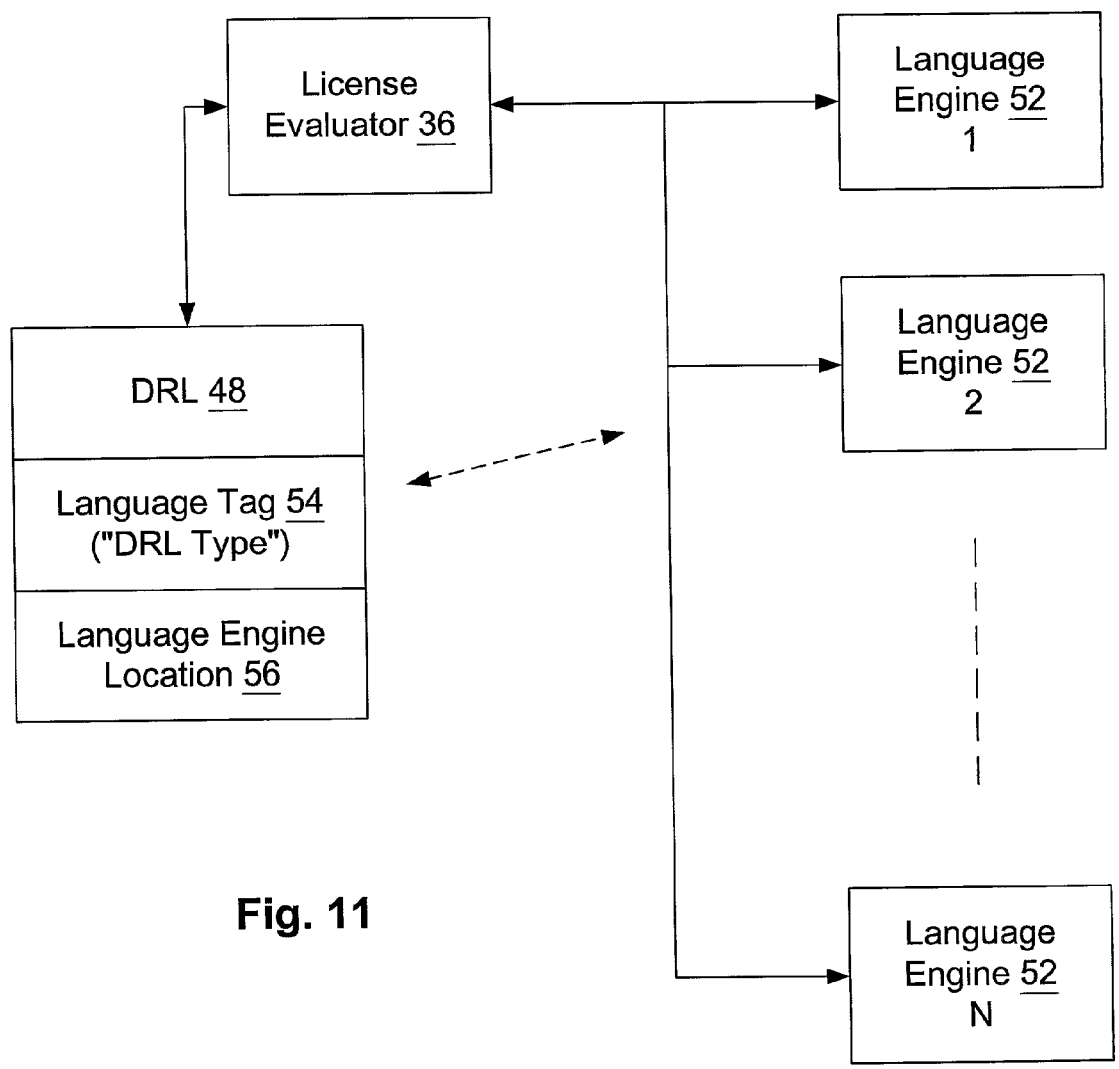
FIG. 11 is a block diagram showing the license evaluator of FIG. 4 along with a Digital Rights License (DRL) of a license and a language engine for interpreting the DRL in accordance with one embodiment of the present invention.

In the present invention, and referring now to FIG. 11, a DRL 48 can be specified in any license language, but includes a language identifier or tag 54. The license evaluator 36 evaluating the license 16, then, performs the preliminary step of reviewing the language tag 54 to identify such language, and then selects an appropriate license language engine 52 for accessing the license 16 in such identified language. As should be understood, such license language engine 52 must be present and accessible to the license evaluator 36. If not present, the language tag 54 and/or the DRL 48 preferably includes a location 56 (typically a web site) for obtaining such language engine 52.

Typically, the language engine 52 is in the form of an executable file or set of files that reside in a memory of the user's computing device 14, such as a hard drive. The language engine 52 assists the license evaluator 36 to directly interrogate the DRL 48, the license evaluator 36 interrogates the DRL 48 indirectly via the language engine 48 acting as an intermediary, or the like. When executed, the language engine 52 runs in a work space in a memory of the user's computing device 14, such as RAM. However, any other form of language engine 52 may be employed without departing from the spirit and scope of the present invention.

Preferably, any language engine 52 and any DRL language supports at least a number of specific license questions that the license evaluator 36 expects to be answered by any DRL 48, as will be discussed below. Accordingly, the license evaluator 36 is not tied to any particular DRL language; a DRL 48 may be written in any appropriate DRL language; and a DRL 48 specified in a new license language can be employed by an existing license evaluator 36 by having such license evaluator 36 obtain a corresponding new language engine 52.

DRL Languages

Two examples of DRL languages, as embodied in respective DRLs 48, are provided below. The first, 'simple' DRL 48 is written in a DRL language that specifies license attributes, while the second 'script' DRL 48 is written in a DRL language that can perform functions according to the script specified in the DRL 48. While written in a DRL language, the meaning of each line of code should be apparent based on the linguistics thereof and/or on the attribute description chart that follows:

Simple DRL 48:
<LICENSE>
<DATA>
<NAME>Beastie Boy's Play</NAME>
<ID>39384</ID>
<DESCRIPTION>Play the song 3 times</DESCRIPTION>

```xml
<TERMS></TERMS>
<VALIDITY>
<NOTBEFORE>19980102 23:20:14Z</NOTBEFORE>
<NOTAFTER>19980102 23:20:14Z</NOTAFTER>
</VALIDITY>
<ISSUEDDATE>19980102 23:20:14Z</ISSUEDDATE>
<LICENSORSITE>http://www.foo.com</LICENSORSITE>
<CONTENT>
<NAME>Beastie Boy's</NAME>
<ID>392</ID>
<KEYID>39292</KEYID>
<TYPE>MS Encrypted ASF 2.0</TTYPE>
</CONTENT>
<OWNER>
<ID>939KDKD393KD</ID>
<NAME>Universal</NAME>
<PUBLICKEY></PUBLICKEY>
</OWNER>
<LICENSEE>
<NAME>Arnold</NAME>
<ID>939KDKD393KD</ID>
<PUBLICKEY></PUBLICKEY>
</LICENSEE>
<PRINCIPAL TYPE==AND=>
<PRINCIPAL TYPE==OR=>
<PRINCIPAL>
<TYPE>x86Computer</TYPE>
<ID>3939292939d9e939</ID>
<NAME>Personal Computer</NAME>
<AUTHTYPE>Intel Authenticated Boot PC SHA-1DSA512</AUTHTYPE>
<AUTHDATA>29293939</AUTHDATA>
</PRINCIPAL>
<PRINCIPAL>
<TYPE>Application</TYPE>
<ID>2939495939292</ID>
<NAME>Window=s Media Player</NAME>
<AUTHTYPE>Authenticode SHA-1</AUTHTYPE>
<AUTH DATA>93939</AUTH DATA>
</PRINCIPAL>
</PRINCIPAL>
<PRINCIPAL>
<TYPE>Person</TYPE>
<ID>39299482010</ID>
<NAME>Arnold Blinn</NAME>
<AUTHTYPE>Authenticate user</AUTHTYPE>
<AUTHDATA>\\redmond\arnoldb</AUTHDATA>
</PRINCIPAL>
</PRINCIPAL>
<DRLTYPE>Simple</DRLTYPE>[the language tag 54]
<DRLDATA>
<START>19980102 23:20:14Z</START>
<END>19980102 23:20:14Z</END>
<COUNT>3</COUNT>
<ACTION>PLAY</ACTION>
</DRLDATA>
<ENABLINGBITS>aaaabbbbccccdddd</ENABLINGBITS>
</DATA>
<SIGNATURE>
<SIGNERNAME>Universal</SIGNERNAME>
<SIGNERID>9382ABK3939DKD</SIGNERID>
<HASHALGORITHMID>M D5</HASHALGORITHMID>
<SIGNALGORITHMID>RSA 128</SIGNALGORITHMID>
<SIGNATURE>xxxyyyxxxyyyxxxyyy</SIGNATURE>
<SIGNERPUBLICKEY></SIGNERPUBLICKEY>
<CONTENTSIGNEDSIGNERPUBLICKEY></CONTENTSIGNEDSI GNERPUBLICKEY>
</SIGNATURE>
</LICENSE>
```

Script DRL 48:
```xml
<LICENSE>
<DATA>
<NAME>Beastie Boy's Play</NAME>
<ID>39384</ID>
<DESCRIPTION>Play the song unlimited</DESCRIPTION>
<TERMS></TERMS>
<VALIDITY>
<NOTBEFORE>19980102 23:20:14Z</NOTBEFORE>
<NOTAFTER>19980102 23:20:14Z</NOTAFTER>
</VALIDITY>
<ISSUEDDATE>19980102 23:20:14Z</ISSUEDDATE>
<LICENSORSITE>http://www.foo.com</LICENSORSITE>
<CONTENT>
<NAME>Beastie Boy's</NAME
<ID>392</ID>
<KEYID>3929221 /KEYID>
<TYPE>MS Encrypted ASF 2.0</TTYPE>
</CONTENT>
<OWNER>
<ID>939KDKD393KD</ID>
<NAME>Universal</NAME>
<PUBLICKEY></PUBLICKEY>
</OWNER>
<LICENSEE>
<NAME>Arnold</NAME>
<ID>939KDKD393KD</ID>
<PUBLICKEY></PUBLICKEY>
</LICENSEE>
<DRLTYPE>Script</DRLTYPE> [the language tag 54]
<DRLDATA>
function on_enable(action, args) as boolean
result=False
if action="PLAY" then
result=True
end if
on_action=False
end function
. . .
</DRLDATA>
</DATA>
<SIGNATURE>
<SIGNERNAME>Universal</SIGNERNAME>
<SIGNERID>9382</SIGNERID>
<SIGNERPUBLICKEY></SIGNERPUBLICKEY>
<HASHID>MD5</HASHID>
<SIGNID>RSA 128</SIGNID>
<SIGNATURE>xxxyyyxxxyyyxxxyyy</SIGNATURE>
<CONTENTSIGNEDSIGNERPUBLICKEY></CONTENTSIGNEDSI GNERPUBLICKEY>
</SIGNATURE>
</LICENSE>
```

In the two DRLs 48 specified above, the attributes listed have the following descriptions and data types:

| Attribute | Description | Data Type |
|---|---|---|
| Id | ID of the license | GUID |
| Name | Name of the license | String |
| Content Id | ID of the content | GUID |
| Content Key Id | ID for the encryption key of the content | GUID |
| Content Name | Name of the content | String |
| Content Type | Type of the content | String |
| Owner Id | ID of the owner of the content | GUID |
| Owner Name | Name of the owner of the content | String |
| Owner Public Key | Public key for owner of content. This is a base-64 encoded public key for the owner of the content. | String |
| Licensee Id | Id of the person getting license. It may be null. | GUID |
| Licensee Name | Name of the person getting license. It may be null. | String |
| Licensee Public Key | Public key of the licensee. This is the base-64 encoded public key of the licensee. It may be null. | String |
| Description | Simple human readable description of the license | String |
| Terms | Legal terms of the license. This may be a pointer to a web page containing legal prose. | String |
| Validity Not After | Validity period of license expiration | Date |
| Validity Not Before | Validity period of license start | Date |
| Issued Date | Date the license was issued | Date |
| DRL Type | Type of the DRL. Example include "SIMPLE" or "SCRIPT" | String |
| DRL Data | Data specific to the DRL | String |
| Enabling Bits | These are the bits that enable access to the actual content. The interpretation of these bits is up to the application, but typically this will be the private key for decryption of the content. This data will be base-64 encoded. Note that these bits are encrypted using the public key of the individual machine. | String |
| Signer Id | ID of person signing license | GUID |
| Signer Name | Name of person signing license | String |
| Signer Public Key | Public key for person signing license. This is the base-64 encode public key for the signer. | String |
| Content Signed Signer Public Key | Public key for person signing the license that has been signed by the content server private key. The public key to verify this signature will be encrypted in the content. This is base-64 encoded. | String |
| Hash Alg Id | Algorithm used to generate hash. This is a string, such as "MD5". | String |
| Signature Alg Id | Algorithm used to generate signature. This is a string, such as "RSA 128". | String |
| Signature | Signature of the data. This is base-64 encoded data. | String |

Methods

As was discussed above, it is preferable that any language engine 52 and any DRL language support at least a number of specific license questions that the digital license evaluator 36 expects to be answered by any DRL 48. Recognizing such supported questions may include any questions without departing from the spirit and scope of the present invention, and consistent with the terminology employed in the two DRL 48 examples above, in one embodiment of the present invention, such supported questions or 'methods' include 'access methods', 'DRL methods', and 'enabling use methods', as follows:

Access Methods

Access methods are used to query a DRL 48 for top-level attributes.

VARIANT QueryAttribute (BSTR key)

Valid keys include License.Name, License.Id, Content. Name, Content.Id, Content.Type, Owner.Name, Owner.Id, Owner.PublicKey, Licensee.Name, Licensee.Id, Licensee. PublicKey, Description, and Terms, each returning a BSTR variant; and Issued, Validity.Start and Validity.End, each returning a Date Variant.

DRL Methods

The implementation of the following DRL methods varies from DRL 48 to DRL 48. Many of the DRL methods contain a variant parameter labeled 'data' which is intended for communicating more advanced information with a DRL 48. It is present largely for future expandability.

Boolean IsActivated(Variant data)

This method returns a Boolean indicating whether the DRL 48/license 16 is activated. An example of an activated license 16 is a limited operation license 16 that upon first play is active for only 48 hours.

Activate(Variant data)

This method is used to activate a license 16. Once a license 16 is activated, it cannot be deactivated.

Variant QueryDRL(Variant data)

This method is used to communicate with a more advanced DRL 48. It is largely about future expandability of the DRL 48 feature set.

Variant GetExpires(BSTR action, Variant data)

This method returns the expiration date of a license 16 with regard to the passed-in action. If the return value is NULL, the license 16 is assumed to never expire or does not yet have an expiration date because it hasn't been activated, or the like.

Variant GetCount(BSTR action, Variant data)

This method returns the number of operations of the passed-in action that are left. If NULL is returned, the operation can be performed an unlimited number of times.

Boolean IsEnabled(BSTR action, Variant data)

This method indicates whether the license 16 supports the requested action at the present time.

Boolean IsSunk(BSTR action, Variant data)

This method indicates whether the license 16 has been paid for. A license 16 that is paid for up front would return TRUE, while a license 16 that is not paid for up front, such as a license 16 that collects payments as it is used, would return FALSE.

Enabling Use Methods

These methods are employed to enable a license 16 for use in decrypting content.

Boolean Validate (BSTR key)

This method is used to validate a license 16. The passed-in key is the black box 30 public key (PU-BB) encrypted by the decryption key (KD) for the corresponding digital content 12 (i.e.,(KD(PU-BB))) for use in validation of the signature of the license 16. A return value of TRUE indicates that the license 16 is valid. A return value of FALSE indicates invalid.

int OpenLicense 16(BSTR action, BSTR key, Variant data)

This method is used to get ready to access the decrypted enabling bits. The passed-in key is (KD(PU-BB)) as described above. A return value of 0 indicates success. Other return values can be defined.

BSTR GetDecryptedEnablingBits (BSTR action, Variant data)

Variant GetDecryptedEnablingBitsAsBinary (BSTR action, Variant Data)

These methods are used to access the enabling bits in decrypted form. If this is not successful for any of a number of reasons, a null string or null variant is returned.

void CloseLicense (BSTR action, Variant data)

This method is used to unlock access to the enabling bits for performing the passed-in action. If this is not successful for any of a number of reasons, a null string is returned.

Heuristics

As was discussed above, if multiple licenses 16 are present for the same piece of digital content 12, one of the licenses 16 must be chosen for further use. Using the above methods, the following heuristics could be implemented to make such choice. In particular, to perform an action (say APLAY@) on a piece of digital content 12, the following steps could be performed:

1. Get all licenses 16 that apply to the particular piece of digital content 12.
2. Eliminate each license 16 that does not enable the action by calling the IsEnabled function on such license 16.
3. Eliminate each license 16 that is not active by calling IsActivated on such license 16.
4. Eliminate each license 16 that is not paid for up front by calling IsSunk on such license 16.
5. If any license 16 is left, use it. Use an unlimited-number-of-plays license 16 before using a limited-number-of-plays license 16, especially if the unlimited-number-of-plays license 16 has an expiration date. At any time, the user should be allowed to select a specific license 16 that has already been acquired, even if the choice is not cost-effective. Accordingly, the user can select a license 16 based on criteria that are perhaps not apparent to the DRM system 32.
6. If there are no licenses 16 left, return status so indicating. The user would then be given the option of:
   using a license 16 that is not paid for up front, if available;
   activating a license 16, if available; and/or
   performing license acquisition from a license server 24.

DRL Language—Specifying Rights According to Events

Figure 13:
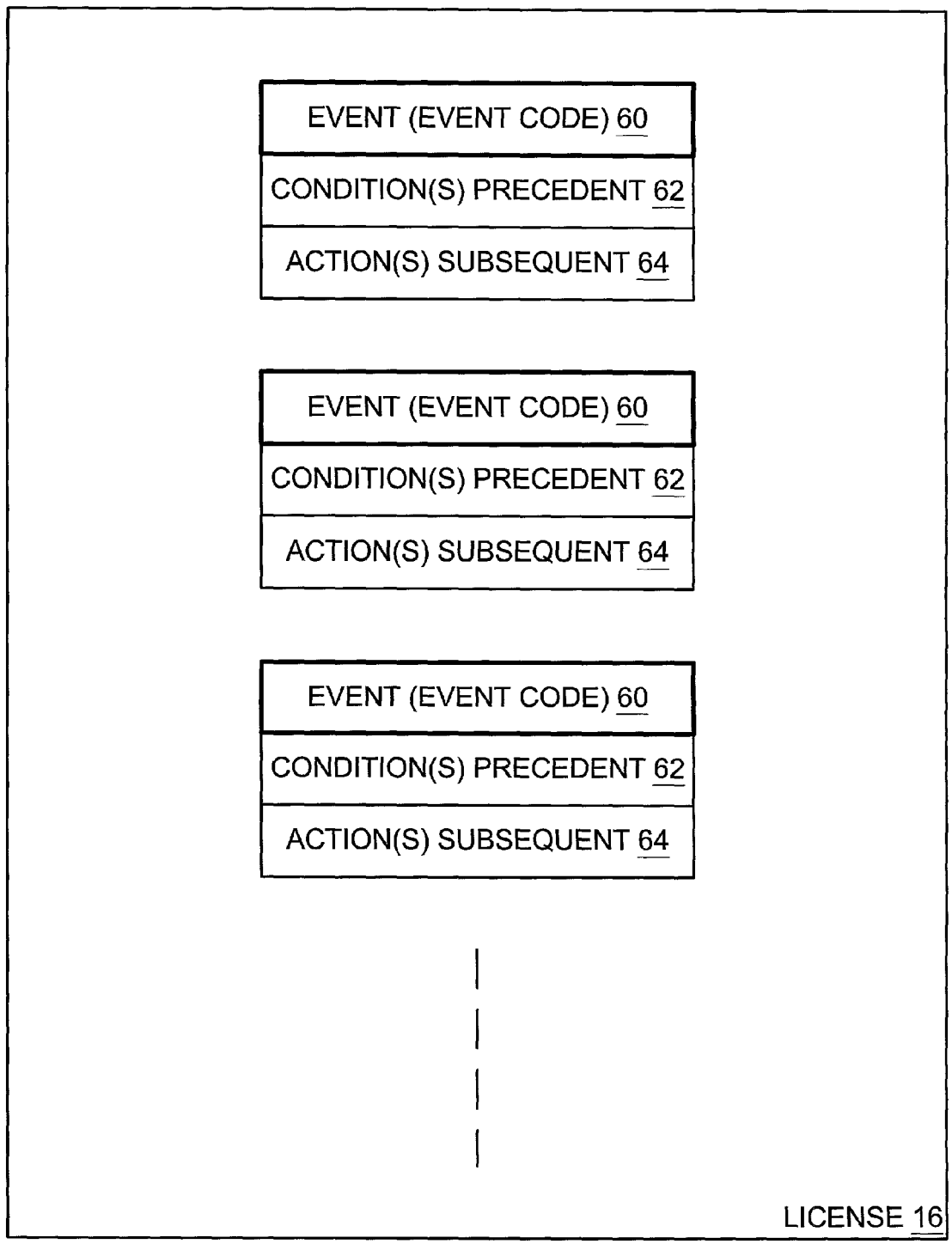
FIG. 13 is a block diagram showing the license of FIG. 8 specified in terms of events including requested events having conditions precedent to approval thereof and/or actions to be taken after the requested event occurs, in accordance with one embodiment of the present invention.

The examples of DRL licenses 16 set forth above have pre-determined fields containing predetermined types of data such as a number of plays authorized, an expiration date, etc. Accordingly, such licenses 16 are not especially flexible, and in particular cannot be employed to specify more specialized rights. In one embodiment of the present invention, then, the DRM license 16 is constructed to be more flexible in that the license is written according to a DRL language that specifies rights according to events. Importantly, and referring now to FIG. 13, for each event 60, the flexible DRL language ("flex language") can specify conditions 62 precedent to allowing the event 60 to proceed and actions 64 to be taken once the event 62 has been allowed to proceed. In addition, in one embodiment of the present invention, the flex language allows the license 16 to store and modify license-related information such as state information in the license store 38, the state store 40, or elsewhere.

The flex language allows the license 16 to specify the conditions 62 under which each event 60 can occur on the computing device 14. In addition, after the event 60 has occurred or is permitted to occur, the flex language allows the license 16 to specify actions 64 to be taken, primarily for the purpose of creating/maintain/updating (i.e., modifies, generally) state information relating to the license 16 and/or the corresponding content 12.

In one embodiment of the present invention, the flex language can specify conditions 62 precedent to and/or actions to be taken in connection with five main types of events 60: storage of the license 16, selection of the license 16, deletion of the license 16, a request for an action with respect to the license 16, and a clock rollback. Of course, other types of events 60 may be specified by the flex language without departing from the spirit and scope of the present invention.

As discussed above, each event 60 may have a condition 62 and/or an action 64 to be taken. In a license 16 constructed according to the flex language and in accordance with one embodiment of the present invention, each condition item 62 and action item 64 is set forth in the form of an expression to be evaluated. Typically, a condition that evaluates to 0 is false, and a condition that evaluates to non-zero is treated as true.

Each of the five main types of events 60 is discussed below, in turn, along with corresponding event code for effectuating and/or responding to the event 60.

Storage of the License 16

The license 16 can be written according to the flex language to allow storage in the license store 38 or elsewhere only if certain conditions 62 have been met, such as for example having a relatively current DRM black box 30. Further, upon storing the license 16, such license 16 can effectuate actions 64 such as creating a play count and/or selection counter in the DRM state store 40 or elsewhere.

An example of ONSTORE event code within a license 16 for responding to a request to store the license 16 is as follows:

```
<ONSTORE>
    <CONDITION>
        <! [CDATA[
        versioncompare(drm.version, "2.0.0.0" ) >= 0
    </CONDITION>
    <ACTION>
        <! [CDATA[
        !exists (secstate.playcount) ? (secstate.playcount=5;
        secstate.cdcachecount=1; 1) :1
        ]]>
    </ACTION>
</ONSTORE>
```

As may be appreciated, such ONSTORE event code requires as a condition 62 of storage of the license 16 that the DRM system 32 have at least a certain version number. As may also be appreciated, upon in fact storing the license 16, the ONSTORE event code effectuates an action 64 that creates state data for the license 16 if such state data does not already exist.

Generally, the ONSTORE condition 62 must be evaluated as true before the license is stored. If the ONSTORE condition 62 is not present, it is assumed true. The ONSTORE action 64 is evaluated after storing the license 16, and is employed (for example) to initialize a secure state corresponding to the license 16 with state data. Such state data preferably persists even if the license 16 is deleted. Thus, it is a good idea to check if the state data exists before initializing state variables such as play count. Secure state variables cannot be read unless they exist in the secure state. Assignments will create such variables if not already existing. However, retrieval of non-existing secure state variables fails.

Selection of the License 16

The license 16 can be written according to the flex language to allow selection thereof for purposes of rendering corresponding content 12 only if certain conditions 62 have been met, such as for example having the content 12 present and/or accessible by the DRM system 32, having a rendering application with a minimum security level, and within a specified date range. Further, upon selection of the license 16, such license 16 can effectuate actions 64 such as incrementing a play count and/or selection counter in the DRM state store.

An example of ONSELECT event code within a license 16 for responding to a request to select the license 16 is as follows:

```
<ONSELECT>
    <CONDITION>
        <! [CDATA[
        machine.datetime <= #19991231 09:00# &&
        content.CID == "{0000050B-0000-0010-8000-00AA006D2EA4}" &&
        app.minseclevel >= 500
        ]]>
    </CONDITION>
</ONSELECT>
```

As may be appreciated, such ONSELECT event code requires as a condition 62 of selection of the license 16 that the current date be before a set date, that the corresponding content be on the computing device 14, and that the rendering application have a minimum security level. As may also be appreciated, upon in fact selecting the license 16, the ONSELECT event code does not effectuate any actions 64, although it is to be appreciated that actions 64 could in fact be effectuated without departing from the spirit and scope of the present invention.

Generally, the ONSELECT condition 62 is evaluated when the license is selected. If the condition 62 is true the license can be selected; otherwise, the license cannot be selected. If the condition 62 is missing, it is assumed true. If this event has action 64, the action 64 is evaluated after the license 16 is selected.

Deletion of the License 16

The license 16 can be written according to the flex language to allow deletion thereof only if certain conditions 62 have been met, such as for example ensuring that state information relating to the license 16 continues to be stored in the state store 40. Correspondingly, upon deleting the license 16, such license 16 can effectuate actions 64 such as deleting the state information relating to the license 16 and stored in the state store 40.

An example of ONDELETE event code within a license 16 for responding to a request to delete the license 16 is as follows:

```
<ONDELETE>
    <CONDITION>
        <! [CDATA[
        machine.datetime >= #20001231 09:00# &&
        ]]>
    </CONDITION>
</ONDELETE>
```

As may be appreciated, such ONDELETE event code requires as a condition 62 of deletion of the license 16 that the current date be after a set date. As may also be appreciated, upon in fact deleting the license 16, the ONDELETE event code does not effectuate any actions 64, although it is to be appreciated that actions 64 could in fact be effectuated without departing from the spirit and scope of the present invention.

Generally, the ONDELETE condition 62 is evaluated when the license is deleted. If the condition 62 is true the license can be deleted; otherwise, the license cannot be deleted. If the condition 62 is missing, it is assumed true. If this event has action 64, the action 64 is evaluated after the license is deleted.

Action with Respect to the License 16

A selection of a license 16 usually occurs in connection with an action event, such as 'play', 'print', 'copy', etc. with regard to the corresponding content 12. Note that an 'action event' is not an action 64, but is a request from a rendering application or the like. According to the flex language, then, the license 16 may specify several different 'action events', and more particularly conditions 62 precedent and/or actions 64 to be effectuated with regard to each action event. Each action event is initiated by a rendering application seeking for example to render the content 12 corresponding to the license 16. The license 16 may thus be written according to the flex language to address each such action event that a rendering application may initiate, or only some of such action events. The license 16 can be written to allow the action event to proceed only if certain conditions 62 have been met, such as having a play count in the state store 40 greater than zero. Further, on the occurrence of the action event, the license 16 can take actions such as decrementing the play count in the state store 40.

Several examples of ONACTION event code within a license 16 for responding to a request to take action with respect to content 12 corresponding to the license 16 are as follows. Each ONACTION event code example is differentiated from others by an action type such as PLAY, RESTORE, BURN CD, etc. Notably, the action type is dictated by the types of actions allowed by the rendering application attempting to render the content 12 corresponding to the license 16. Accordingly, it is to be appreciated that the license 16 must be written to support at least some of the types of action that the rendering application is capable of performing. Consequently, failure to include in a selected license 16 ONACTION event code corresponding to a type of action of which the rendering application is capable of performing in effect prevents such rendering application from performing such type of action, at least with regard to such selected license 16.

```
<ONACTION type="PLAY">
    <CONDITION>
        <! [CDATA[
            secstate.playcount > 0
        ]]>
    </CONDITION>
    <ACTION>
        <! [CDATA[
            secstate.playcount--;
        ]]>
    </ACTION>
</ONACTION>
```

As may be appreciated, such ONACTION-PLAY event code requires as a condition 62 of play that a play count maintained as state information be greater than zero. As may also be appreciated, upon in fact playing the content 12, the license 16 effectuates an action 64 in which the play count is decremented. Accordingly, based on such ONACTION-PLAY event code, the license 16 may be employed to render or play the corresponding content 12 a set number of times, and then no more.

```
<ONACTION type="BURNCD">
    <CONDITION>
        <! [CDATA[
            app.seclevel >= 1000 && secstate.cdcachecount > 0
        ]]>
    </CONDITION>
    <ACTION>
        <! [CDATA[
            secstate.cdcachecount--;
        ]]>
    </ACTION>
</ONACTION>
```

Such ONACTION-BURNCD event code requires as a condition 62 of burning (i.e., writing) a compact disk (CD) based on the corresponding content 12 that the application have a minimum security level and that a cache count of CD burns be greater than zero. Upon in fact burning the CD, the license 16 effectuates an action 64 in which the cache count of CD burns is decremented. Accordingly, based on such ONACTION-PLAY event code, the license 16 may be employed to burn a CD a set number of times, and then no more.

```
<ONACTION type="Backup">
    <CONDITION>
        <! [CDATA[
            1
        ]]>
    </CONDITION>
</ONACTION>
```

Such ONACTION-BACKUP event code is examined upon the backing up the license 16 (i.e., saving a copy of the license 16 in another location). Here, the condition portion 62 of the event code is simply the value 1 or true, whereby backing up is always allowed. Alternatively, the condition portion 62 could simply be omitted to achieve the same result. Upon in fact backing up the license 16, the ONACTION-BACKUP event code does not effectuate any actions 64, although it is to be appreciated that actions 64 could in fact be effectuated without departing from the spirit and scope of the present invention.

```
<ONACTION type="Restore">
    <CONDITION>
        <! [CDATA[
            1
        ]]>
    </CONDITION>
</ONACTION>
```

Similar to the ONACTION-BACKUP event code above, the ONACTION-RESTORE event code is examined upon the restoring of a backed-up license 16 (i.e., obtaining the saved copy of the license 16 from the another location). Here, and again, the condition portion 62 of the event code is simply the value 1 or true, whereby restoring is always allowed. Also again, the condition portion 62 could simply be omitted to achieve the same result. Upon in fact restoring the license 16, the ONACTION-RESTORE event code does not effectuate any actions 64, although it is to be appreciated that actions 64 could in fact be effectuated without departing from the spirit and scope of the present invention.

Generally, each piece of ONACTION event code includes an identifying type which indicates the corresponding type of action event. The condition 62 associated with the event code is evaluated when the rendering application requests the type of action event with regard to the license 16. If the condition 62 is true, the action event is allowed; otherwise, the action event is not allowed. If the condition 62 is missing, it is assumed true. If the action event is allowed and after the action event takes place, any action 64 associated with the event code is performed.

Clock Rollback

An unscrupulous user may attempt to subvert a date- or time-based license term by rolling back the clock 46 (FIG. 4) on the computing device 14 upon which the DRM system 32 resides or another appropriate clock. A clock rollback, then, is a special event 60 wherein the DRM system 32 determines that the clock 46 has in fact been rolled back. The license 16 may thus be written according to the flex language to effectuate actions 64 such as incrementing a rollback counter or even deleting the license 16 itself. Note that conditions 62 are not believed necessary in the case of a clock rollback event, inasmuch as the license 16 is not allowing the clock rollback event 60 but instead is responding to such event 60. Nevertheless, conditions 62 may be employed in connection with such clock rollback event 60 without departing from the spirit and scope of the present invention.

An example of ONCLOCKROLLBACK event code within a license 16 for responding to a detected clock rollback is as follows:

```
<ONCLOCKROLLBACK>
    <ACTION>
        <! [CDATA[
            deletelicense()
        ]]>
    </ACTION>
</ONCLOCKROLLBACK>
```

Here, it is seen that upon accessing the license 16, and upon detecting a clock rollback, the license 16 effectuates a delete action 64 whereby such license 16 is deleted from the computing device 14. Of course, a less draconian measure may be taken without departing from the spirit and scope of the present invention. Such other examples are discussed below.

Generally, the ONCLOCKROLLBACK event code requires that the computing device 14 and/or DRM system 32 have a mechanism to keep track of the clock 46 on the computing device 14 in such a way that clock rollbacks can be detected. Such a mechanism is discussed below. Generally, any such mechanism may be employed without departing from the spirit and scope of the present invention. Whenever a clock rollback is detected, the DRM system 32 should give every license 16 with ONCLOCKROLLBACK event code a chance to react to the detected rollback by performing the action(s) 64 specified in such event code. Note that in the case of an ONCLOCKROLLBACK event 60, the license does not allow the event 60 to proceed but instead reacts to such event 60 upon the occurrence thereof.

Event code corresponding to an event can be missing or not present from a license 16, in which case there is no condition 62 to check or action 64 to take for the corresponding event 60. Except for ONACTION event code, the absence of the event code in the license 16 implicitly allows the corresponding event 60. For example, missing ONSELECT event code means that the license 16 does not have conditions 62 for the selection of the license 16 and hence the selection may proceed unconditionally.

As should be evident, ONACTION event code is required for each corresponding action event allowed by the license 16. Correspondingly, missing ONACTION event code for an action event means that the action event is not allowed by the license 16 under any circumstances. ONACTION event code must be present to effectuate an action event for the reason that such ONACTION event code represents the actual rights given by the license. In contrast, other types of event code are related to the license 16 itself.

Note that in effectuating an action 64 in connection with an event 60, event code in a license 16 may set forth a test for a condition. Such condition is then a condition precedent to effectuating the action, as opposed to a condition 62 precedent to allowing an event to proceed.

In one embodiment of the present invention, the value for a variable as specified in event code in the license 16 according to the flex language is fetched from a specific place depending on the category. For example, content.CID is retrieved from the corresponding content 12, license.LID is retrieved from the license 16 itself, secstate.playcount is retrieved from the state store 40, and app.seclevel is retrieved from the rendering application. An expression containing an undefined variable terminates with an retrieval error, and a condition 62 with such expression is treated as false. To check the existence of a variable, one can use an exists function or the like.

Figure 14:
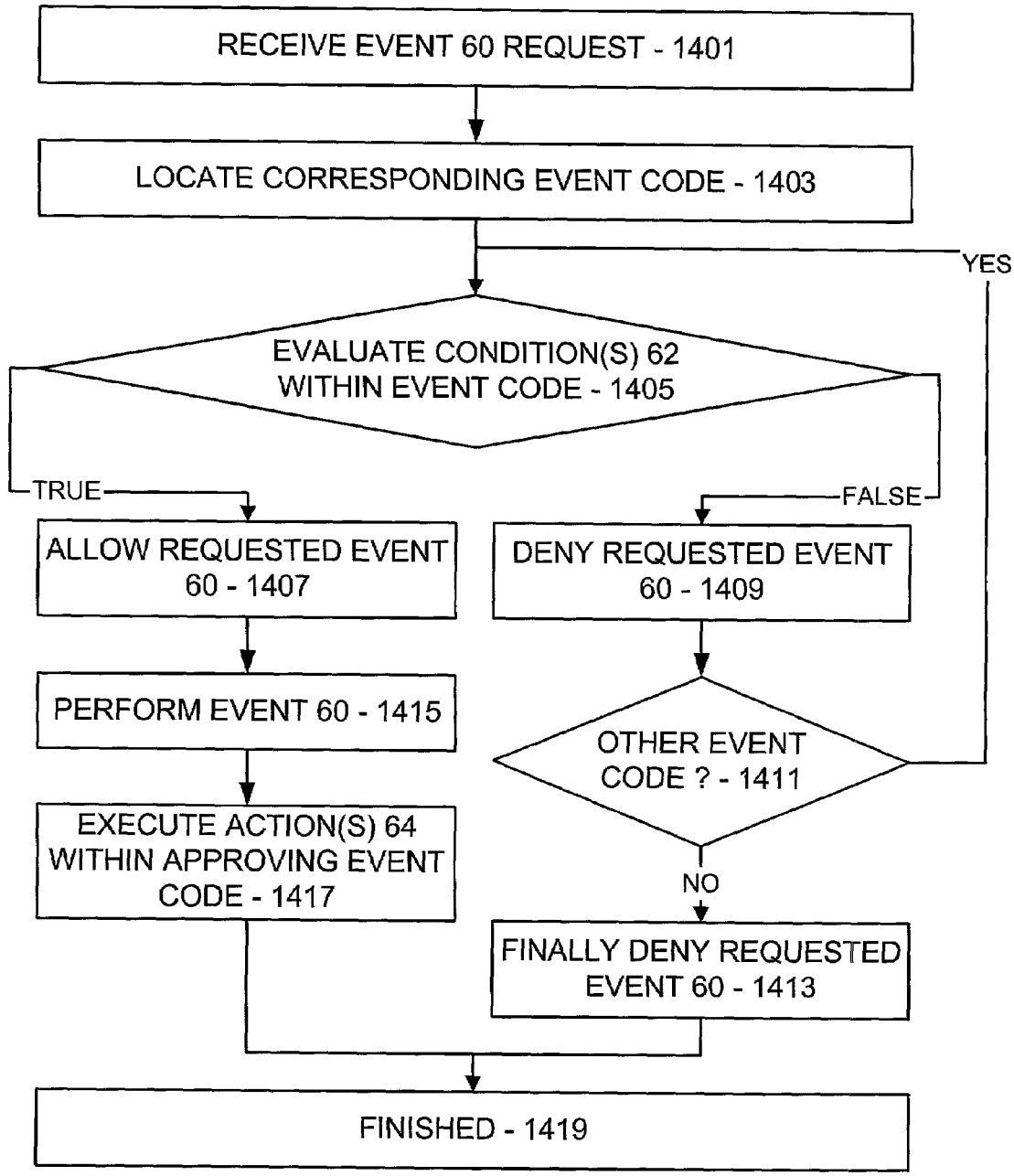
FIG. 14 is a flow diagram showing various steps performed in connection with the license of FIG. 13 in accordance with one embodiment of the present invention.

Generally, and referring now to FIG. 14, upon receiving a request for an event 60 from a rendering application or the like with regard to content 12 (step 1401), event code corresponding to the event 60 in the a corresponding license 16 is located (step 1403). Note that more than one corresponding license 16 may need to be reviewed prior to locating the necessary event code. Note also that the located event code may not approve the request (step 1409), in which case event code in another corresponding license 16 (if available) may be located and examined. Any appropriate mechanism for locating and reviewing the event code in corresponding licenses 16 may be employed without departing from the spirit and scope of the present invention. Such mechanism is known or should be apparent and therefore need not be disclosed herein in any detail.

Assuming appropriate event code is located, such event code is then examined. In particular, any condition 62 within the event code is evaluated as either true or false (step 1405). If true, the requested event 60 is allowed to proceed (step 1407); otherwise, the requested event 60 is not allowed to proceed based on the license 16 of the located event code (step 1409). In the latter case, it is preferable that the requested event be finally denied (step 1413) if no other appropriate event code that may potentially approve the request remains to be examined (step 1411). However, if such other appropriate event code exists control is returned to step 1405 at which the condition 62 within such other event code is evaluated.

Assuming now that the requested event 60 is allowed to proceed, as at step 1407, the rendering application performs such event 60 (step 1415), and any action 64 within the approving event code is executed (step 1417). With the event 60 being allowed to proceed and the action 64 of the approving event code being executed, the approving event code is then finished (step 1419).

An example of a license 16 which includes the events 60 discussed above is set forth in the Appendix attached hereto.

As shown above and as set forth in the Appendix attached thereto, the license 16 of the present invention may be written in a code or the like to specify the conditions 62 to be tested for prior to allowing an event 60 to proceed and/or actions 64 to be taken once the event 60 has been allowed to proceed. Of course, the license 16 still includes the content key (KD) for the corresponding content 12. In addition, the license 16 may include tying information for tying the license to one or more DRM systems 32, as is more fully detailed in U.S. patent application Ser. No. 09/525,509, incorporated by reference herein in its entirety. Also, the license 16 may include restore information in the event the license 16 was restored, as is more fully detailed in U.S. patent application Ser. No. 09/526,290, incorporated by reference herein in its entirety. Further, the license 16 may include other information without departing from the spirit and scope of the present invention.

Clock Rollback Detection Mechanism

Figure 15:
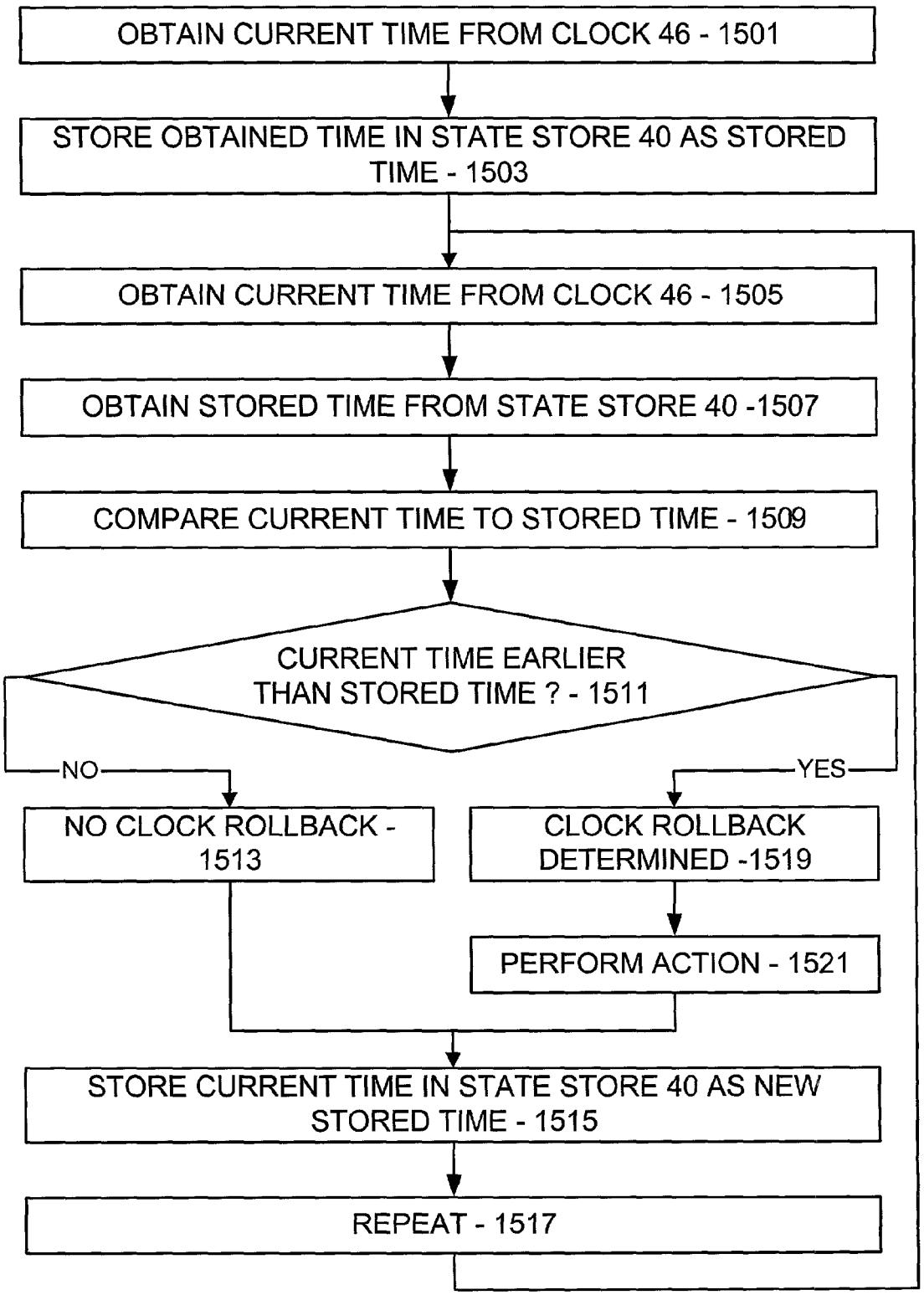
FIG. 15 is a flow diagram showing various steps performed in the course of detecting a clock rollback in accordance with one embodiment of the present invention.

As discussed above, the ONCLOCKROLLBACK event code requires that the computing device 14 and/or DRM system 32 have a mechanism to keep track of the clock 46 on the computing device 14 or elsewhere in such a way that clock rollbacks can be detected. Referring now to FIG. 15, such a mechanism operates in the following manner.

Generally, the mechanism has regular access to the clock 46, and periodically reads such clock 46 to determine if the clock 46 has a time earlier than that which was noted previously. Since time presumably cannot be made to go backwards, at least in this universe, the clock 46 can have a time earlier than that which was previously noted only if the clock 46 was rolled back.

To detect a clock rollback, then, the mechanism initially obtains a current time from the clock 46 (step 1501) and stores the initially obtained time in the secure (state) store 40 as the stored time (step 1503). Thereafter, the mechanism regularly obtains a current ((n)th) time from the clock 46 (step 1505). In one embodiment of the present invention, regularly obtaining the current time is accomplished on a periodic basis such as once a minute, once every 90 seconds, once an hour, or the like. If so, timing is preferably achieved independent of the system clock 46, such as for example by way of a count-down timer. In another embodiment of the present invention, regularly obtaining the current time is accomplished on an event-driven basis, such as for example upon initialization of the DRM system 32, upon receiving a license 16 or content 12, upon receiving a request to employ a license 16, or the like.

With the obtained current ((n)th) time from the clock 46 (step 1505), the mechanism, obtains the stored ((n-1)th) time from the state store 40 (step 1507), compares such current time to such stored time (step 1509), and determines whether the current time is earlier than the stored time (step 1511). If the current time is not earlier than the stored time, as should normally be the case, the mechanism determines that no clock rollback has occurred (step 1513), and the current time is then stored in the state store 40 as a new stored time (step 1515). Such new stored time is then available to the mechanism for comparison to a new current time when the mechanism repeats the process (step 1517). Note that in repeating such process, and as seen in FIG. 15, action proceeds directly to step 1505, where the mechanism once again obtains a current time from the clock 46. Thus, steps 1501 and 1503 need only be performed once as an initialization procedure.

If, however, the current time as obtained from the clock 46 is in fact earlier than the stored time, and again since time presumably cannot be made to go backwards, at least in this universe, the mechanism determines that a clock rollback has occurred (step 1519) based on such current time being earlier than such stored time. Thereafter, and as discussed in more detail below, the mechanism and/or the DRM system 32 take a predetermined course of action based on the determination that the clock rollback occurred (step 1521).

In one embodiment of the present invention, after step 1519. the current time is then stored in the state store 40 as a new stored time (step 1515), and such new stored time is then available to the mechanism for comparison to a new current time when the mechanism repeats the process (step 1517). That is, even though the current time is suspect due to the determined clock rollback, such current time is nevertheless stored as the new current time, and the mechanism continues with its regular determination.

Although the mechanism could stop and not repeat the process, such an action may not be desirable, especially if the clock rollback is viewed as a relatively minor matter not requiring drastic action. Importantly, in the case where the mechanism does in fact repeat the process, failure to store the suspect current time as the new stored time would result in a situation where the mechanism repeatedly determines a clock rollback until the clock is rolled forward beyond the pre-rollback stored time. Especially if the predetermined course of action is costly in resources or time, or if each instance of the predetermined course of action has a cost, it may be better to have only one determined clock rollback than multiple ones.

On the occurrence of a clock rollback and the running of ONCLOCKROLLBACK event code, the current time is not stored as the stored time until after such ONCLOCKROLLBACK event code has been called for each license 16. Thus, a license 16 can use the stored time and current time to determine the temporal amount of the roll back (10 seconds, 10 days, 2 years, etc.) and perhaps employ such information in evaluating conditions in such event code. For example, the event code may ignore the clock rollback if the stored time is prior to an expiration time set according to the license 16.

In the event that the stored time is missing from (deleted from) the state store 40, it should be presumed that a user deleted such stored time in attempt to avoid a time-based license term. Accordingly, if the stored time is missing from he state store 40, the mechanism determines that a clock rollback has occurred (step 1519) based on such missing stored time, and the mechanism and/or the DRM system 32 take the predetermined course of action based on the determination that the clock rollback occurred (step 1521).

Note that by regularly storing the current time in the state store 40 or elsewhere as the stored time, the mechanism provides a convenient saved variable that each license 16 and the DRM system 32 may refer to for time-based checks.

In one embodiment of the present invention, the predetermined course of action (i.e., step 1521) comprises examining each license 16 in the license store 38 for ONCLOCKROLLBACK event code, and if present running such event code to effectuate such event 60. As set forth above, such ONCLOCKROLLBACK event code in each license 16 may effectuate an action 64 whereby:

the license 16 deletes itself;
the license 16 deletes itself if already expired according to the stored time;
the license 16 deletes itself if relatively old as compared to the stored time;
the license 16 increments a rollback counter in the state store 40 or elsewhere and deletes itself after X detected rollbacks;
or the like.

In short, the license 16 can do practically anything that can be composed in the form of event code. In another embodiment of the present invention, the examination of each license occurs only if the license is selected after the determined clock rollback, is selected within a predetermined period of time after the determined clock rollback, or the like.

A clock rollback such as that determined in accordance with the present invention results from the aforementioned situation where an unscrupulous user is attempting to subvert a date- or time-based license term. Notably, such determined clock rollback can also result from an inadvertent situation where an innocent user accidentally adjusts the clock 46 backward, or even in an intentional situation where the innocent user purposefully adjusts the clock 46 backward to a correct time. Appropriate care must be taken, then, in composing the ONCLOCKROLLBACK action 64 in each license 16 to implement a remedy that is severe enough to punish the unscrupulous user and yet flexible enough to not overly punish the innocent user. In this regard, deletion of a license upon a single determined clock rollback may be considered too severe in some circumstances, while a series of gradually increasing punishments upon several determined clock rollbacks may be considered more reasonable.

Note that the concept of an ONCLOCKROLLBACK event 60 and a mechanism to determine a clock rollback may be extended to any other license-related non-decreasing or even non-increasing value without departing from the spirit and scope of the present invention. For example, a decreasing play count maintained in connection with a license that should never increase may be the basis for an event 60 wherein the play count is determined to have nevertheless increased and a corresponding mechanism to determine a play count increase.

Similarly, the concept of an ONCLOCKROLLBACK event 60 and a mechanism to determine a clock rollback may be extended to determining a clock roll-forward event 60. As may be appreciated, an unscrupulous user may attempt to subvert a date- or time-based license term by rolling forward the clock 46 in addition to or instead of rolling back the clock 46. A clock roll forward, then, is a special event 60 wherein the DRM system 32 determines that the clock 46 has in fact been rolled forward. Note, though, that in this instance, since time normally goes forward, comparison of a stored time to a current time from the system clock 46 is not necessarily indicative of a clock roll-forward event 60. Instead, the current time must be referenced to an expected current time as provided by an appropriate source. As one skilled in the art will appreciate, such source may be a secure time source, a count-up timer independent of the system clock 46, or the like.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful enforcement architecture 10 that allows the controlled rendering or playing of arbitrary forms of digital content 12, where such control is flexible and definable by the content owner of such digital content 12. Also, the present invention comprises a new useful controlled rendering environment that renders digital content 12 only as specified by the content owner, even though the digital content 12 is to be rendered on a computing device 14 which is not under the control of the content owner. Further, the present invention comprises a flexible language with which an event-based license 16 may be composed, and a mechanism and method for determining a special event, such as a clock rollback, wherein a system value changes in a manner counter to that which is expected, typically as a result of an unscrupulous user trying to subvert a license term based on the system value.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

Appendix

The following is a sample license for rendering digital content comprising a particular motion picture and/or sound presentation. The license includes many features including the features of the present invention:

```
<?xml version="1.0" ?>
<LICENSE version="2.0.0.0">
<LICENSORINFO>
  <DATA>
    <LID>{00000507-0000-0010-8000-00AA006D2EA4 }</LID>
    <KEYID>Ygiiuk82iok1==<KEYID>
    <ISSUEDDATE>20000102 23:20:14Z</ISSUEDDATE>
    <CONTENTPUBKEY>pokjk8ijkjk92jkjk==</CONTENTPUBKEY>
    <PRIORITY>15</PRIORITY>
    <META>
      <NAME>License for Titanic movie</NAME>
      <DESCRIPTION>License to play on PC and burn CD
      </DESCRIPTION>
      <TERMS>This license is not transferable</TERMS>
      <TRANSACTIONID>12344</TRANSACTIONID>
      <LICENSORNAME>Reciprocal</LICENSORNAME>
      <LICENSORSITE>www.reciprocal.com</LICENSORSITE>
```

-continued

```
    </META>
  <ONSTORE>
    <CONDITION>
      <![CDATA[
      versioncompare(drm.version, "2.0.0.0") >= 0
      ]]>
    </CONDITION>
    <ACTION>
      <![CDATA[
      !exists(secstate.playcount)?(secstate.playcount=5;
      secstate.cdcachecount=1;1):1
      ]]>
    </ACTION>
  </ONSTORE>
  <ONSELECT>
    <CONDITION>
      <![CDATA[
      machine.datetime <= #19991231 09:00# &&
      content.CID ==
      "{0000050B-0000-0010-8000-00AA006D2EA4}" &&
      app.minseclevel >= 500
      ]]>
    </CONDITION>
  </ONSELECT>
  <ONDELETE>
    <CONDITION>
      <![CDATA[
      machine.datetime >= #20001231 09:00# &&
      ]]>
    </CONDITION>
  </ONDELETE>
<ONCLOCKROLLBACK>
    <ACTION>
      <![CDATA[
      deletelicense( )
      ]]>
    </ACTION>
</ONCLOCKROLLBACK>
  <ONACTION type="PLAY">
    <CONDITION>
      <![CDATA[
      secstate.playcount > 0
      ]]>
    </CONDITION>
    <ACTION>
      <![CDATA[
      secstate.playcount--;
      ]]>
    </ACTION>
</ONACTION>
<ONACTION type="BURNCD">
    <CONDITION>
      <![CDATA[
      app.seclevel >= 1000 && secstate.cdcachecount > 0
      ]]>
    </CONDITION>
    <ACTION>
      <![CDATA[
      secstate.cdcachecount--;
      ]]>
    </ACTION>
</ONACTION>
<ONACTION type="Backup">
    <CONDITION>
      <![CDATA[
      1
      ]]>
    </CONDITION>
</ONACTION>
<ONACTION type="Restore">
    <CONDITION>
      <![CDATA[
      1
      ]]>
    </CONDITION>
</ONACTION>
<ENABLINGBITS>
    <ALGORITHM type="MSDRM" />
    <PUBKEY type="machine">WEJKJKJK==</PUBKEY>
```

-continued

```
        <VALUE>AAAABBBBCCCCDDDD</VALUE>
        <SIGNATURE>anvjkhihs==</SIGNATURE>
      </ENABLINGBITS>
      <ENABLINGBITS>
        <ALGORITHM type="MSDRM" />
        <PUBKEY type="machine" >WEJKJKJKert==</PUBKEY>
        <VALUE>AAAABBBBCCCCDDDD</VALUE>
        <SIGNATURE>anvjkhihssfs==</SIGNATURE>
      </ENABLINGBITS>
    </DATA>
    <SIGNATURE>
      <HASHALGORITHM type="SHA" />
      <SIGNALGORITHM type="MSDRM" />
      <VALUE>XXXYYYXXXYYYXXXYYY</VALUE>
    </SIGNATURE>
    <CERTIFICATECHAIN type="MSDRM">
    <!- The first one is the certificate issued by the root authority --
    >
    <!- The last one is the one issued to the license server -->
      <CERTIFICATE>ANJJNDJN</CERTIFICATE>
      <CERTIFICATE>BBHBHDBF</CERTIFICATE>
    </CERTIFICATECHAIN>
  </LICENSORINFO>
  <DRMRESTOREINFO>
    <DATA>
      <LID>{00000507-0000-0010-8000-00AA006D2EA4}</LID>
      <ENABLINGBITS>
        <ALGORITHM type=" MSDRM" >
        <PUBKEY type=" machine" >WEJKJKJK==</PUBKEY>
        <VALUE>AAAABBBBCCCCDDDD</VALUE>
        <SIGNATURE>anvjkhihs==</SIGNATURE>
      </ENABLINGBITS>
    </DATA>
    <SIGNATURE>
      <HASHALGORITHM type=" SHA" >
      <SIGNALGORITHM type=" MSDRM" >
      <VALUE>AAAABBBBCCCCDDDD</VALUE>
    </SIGNATURE>
  </DRMRESTOREINFO>
</LICENSE>
```

Description of Fields

The license has LICENSESORINFO to capture all the information packaged at the license server. DRMRESTOREINFO section is added if and when the license is restored.

LICENSORINFO Data

LID

A unique ID for the license. The secure state on the client machine for a license is tied to this LID. The license generator automatically generates this field. The license server cannot set this field.

KEYID

The key id associated with the license. The key may be tied to the key id. When a license is searched in the license store for particular content, it is necessary to match the key id. The key id can be any text and should not be binary. A GUID string is highly recommended to avoid collisions.

ISSUEDATE

The date the license was issued, in GMT. The license generator automatically generates this field at the time of signing the license.

CONTENTPUBKEY

This field indicates the public key to be used to verify the signature of the content header on the client machine every time the content is used. This field is optional. This is used to prevent a user from tampering with the content header after getting a license. This feature is useful only if the license uses a content variable (e.g. content.CID) and we want to make sure it was not tampered with.

PRIORITY

This field is used to help the client select the appropriate license when there are multiple licenses for the same content. The field indicates the priority of the license. The priority 0 indicates the lowest priority and priority LONG_MAX indicates the highest priority. The license enumeration process at the client will select licenses based on this priority. So, do not issue a license with priority 0 right away as it makes it impossible to deliver another license (e.g. pre-deliver) that should be selected after the original one is used up.

The next few fields give meta data about the license. These are some of the fields that are given for sample. The DRM design does not depend on specific fields. As far as DRM is concerned, they are meta data about the license. The API allows a license server to add any kind of data they want to place in the license. For example, it can add a tag indicating the type of license. On the client side, this data is made available to the application using DRM directly but not for an application that uses SDK. Thus, the specific information placed in this section depends on the availability of applications that can make use of this data. The license servers can add or remove fields in this section at any time. Inside the META section, the license server can supply attribute value pairs.

ENABLINGBITS

This tag is used to specify information to unlock the content. The sub-fields indicate the parameters needed.

ALGORITHM

Indicates the type of algorithm used to specify the key. The type attribute indicates the type of algorithm used. Possible values include "MSDRM".

If the tag is missing, MSDRM is assumed.

PUBKEY

Indicates the public key to which the enabling bits are bound. The attribute type indicates what type of entity. For example, type="machine" indicates that it is bound to machine. type="user" or something else might mean that it is bound to another entity. The only supported entity is "machine" at this time.

VALUE

The encrypted value of the key. The key is encoded in a way that it helps detect sometimes whether the decoding was successful. It is encrypted with the machine's public key so that only DRM client can retrieve the key.

SIGNATURE

This is the signature of the key (not the VALUE field above) itself. It is signed by the license server. This prevents tampering of the license by someone who changes the fields and re-signs with their own key. In that case, the enabling bits become useless as they cannot produce the signature as the key itself is not retrievable from the VALUE.

SIGNATURE

This section is used to sign the DATA section. The sub-fields of this section are HASHALGORITHM, SIGNALGORITHM, and VALUE.

HASHALGORITHM

The attribute type of this tag indicates the type of hashing used. If the type requires parameters then they will be supplied as sub-fields. Possible value for type include "SHA".

SIGNALGORITHM
  This tag is used to indicate the signing algorithm. The type attribute indicates the type of algorithm. Possible values include "MSDRM". If this is missing, MSDRM is assumed.
VALUE
  This is the actual signature. It is signed by the license server. The public key needed to verify is taken from the certificate explained below.
CERTIFICATECHAIN
  This section is used to indicate the certificate chain. The certificate chain is used to indicate to the DRM Client that the license server was authorized to issue licenses. The root authority may be Microsoft Corporation or the like. Each child of this tag represents a certificate. The first certificate represents the certificate issued by the root authority. The DRM client has the public key of the root authority to verify the certificates. The last certificate is the one issued to the license server. The public key in this certificate is used to verify the signature of the license.
CERTIFICATE
  This tag represents the certificate blob.

Operators

This section describes the various operators allowed in an expression to be evaluated in a license and how the operators behave for various types. The precedence of these operators are as defined for the C language.

| Operator | Operand1 | Operand2 | Result Description |
|---|---|---|---|
| + | LONG | | Unary plus |
| + | LONG | LONG | Binary addition. |
| + | STRING | STRING | Concatenation of strings |
| − | LONG | | Unary minus |
| − | LONG | LONG | Binary subtraction. |
| * | LONG | LONG | Binary multiplication. |
| / | LONG | LONG | Integer Division. E.g. 7/3 is 2 |
| % | LONG | LONG | Arg1 % Arg2. 7 % 3 is 1. |
| ++ | LONG | | Unary post or pre increment operator. Variable should support set operation. |
| -- | LONG | | Unary post or pre decrement operator. Variable should support set operation. |

-continued

| Operator | Operand1 | Operand2 | Result Description |
|---|---|---|---|
| = | LONG | LONG | simple assignment |
| = | STRING | STRING | simple assignment |
| = | DATETIME | DATETIME | simple assignment |
| < <= > >= == != | LONG | LONG | Relational operator. Result LONG. The value will be 0 or 1. |
| < <= > >= == != | STRING | STRING | Just like for LONG |
| < <= > >= == != | DATETIME | DATETIME | Just like for LONG |
| ! | LONG | N/A | Unary Not. Result LONG. 0 or 1. |
| && | LONG | LONG | Logical AND. Result is 0 or 1. |
| \|\| | LONG | LONG | Logical OR. Result is 0 or 1. |
| ; | LONG | LONG | The result is the value of the 2$^{nd}$ operand. Useful for sequence. a ; 1 returns 1. a is not evaluated as its value is not needed. However, any expression before ; goes through normal evaluation. For example, in 1 + 2 ; 4, 1 + 2 is evaluated. |
| () | | | Allows to override precedence |
| ?: | ANY | ANY | Conditional expression. E.g.: (a < b) ? c : d. If condition a < b is true, then the value of this is c and d is not evaluated. If the condition a < b is false, then the value is d and c is not evaluated. |
| , | ANY | ANY | This is used for parameter list for function calls. The operator is like no-op. The two operands are kept for passing to the function. |

Functions

An expression to be evaluated in a license can contain some pre-defined function calls. The following table shows the list of functions supported and their description. Functions are evaluated as soon the argument list is closed.

| Function | Arg1 | Arg2 | Arg3 | Description |
|---|---|---|---|---|
| min | LONG | LONG | | minimum. Result is LONG |
| max | LONG | LONG | | maximum. Result is LONG |
| long | STRING | | | Convert STRING to long. String has syntax [whitespace][sign][number]. number should have at least one digit. It can be decimal or hexadecimal. No whitespace allowed after sign. Trailing spaces are ok. |
| long | LONG | | | identity operation. |
| string | LONG | | | Convert LONG to STRING. |
| string | STRING | | | Like identity function. |
| string | DATETIME | | | Convert date to string |
| datetime | STRING | | | Converts to date. |
| datetime | DATETIME | | | Date (identity operation) |
| dateadd | STRING | LONG | DATETIME | Arg1 can be d (days) or h (hours) or n (minutes) or s (seconds). The corresponding amount specified in Arg2 is added to the given datetime to get the target datetime. Result is DATTTIME |
| datediff | STRING | DATETIME | DATETIME | Arg3 − Arg2. Result is given in units as indicated in Arg1. Arg1 can be d or h or n or s. Result is LONG |

-continued

| Function | Arg1 | Arg2 | Arg3 | Description |
|---|---|---|---|---|
| datepart | STRING | DATETIME | | Result is LONG. Arg1 can be y or m or d or h or n or s. |
| index | STRING | STRING | | index of Arg1 in Arg2 if it is found. The first index is 0. If not found, return −1. Result is LONG |
| length | STRING | | | Length of Arg1. Result is LONG |
| deletelicense | | | | Delete the current license. Return 1 if successful. 0 else. |
| exists | A Variable | | | Checks if variable exists. The method will try to fetch the value and return true if successful. false otherwise. |
| versioncompare | string | string | | Compares the two strings treating them as versions. The result is undefined if the strings are not versions. A version string has the form <n>.<n>.<n>.<n> where <n> is a number. |

Pre-Defined Variables

An expression to be evaluated in a license can have variables that belong one of several categories. The categories are drm, license, content, machine, server, app, and secstate. Secure state exposes secure state in the client. For each license, a collection of attribute/value pairs are exposed. It is up to the license to create and access these attributes. Once created, they cannot be deleted. A license can only access attribute value pairs that correspond to this license. The following table enumerates all possible variables that are exposed.

| Variable | TYPE | Description |
|---|---|---|
| drm.version | STRING | The version of DRM. e.g. "2.0.0.0". This variable does not use build number but rather hard-coded value in the client. |
| drm.bb.msdrm.version | STRING | The current black box version. This data is not necessary very secure. |
| drmk.version | STRING | The version of DRMK on the client machine. This variable will not exists on a machine with no DRMK. Use exists(drmk.version) to check the presence of DRMK. |
| drmk.parameter | STRING | A string to be used to set up DRMK. The string should be of the form attr = value; attr = value; etc. The supported attributes are spdif, certs, mindrmdriverlevel. The default values for these are true, false, and 1000. spdif = true => allow digitalout. certs = true => require certified drivers. mindrmlevel is used to indicate the level of security needed of the drivers. Don't use mindrmdriverlevel if certs = false. |
| machine.datetime | DATETIME | The GMT time computed based on client machine's clock. |
| app.count | LONG | The number of DRM certificates used currently. The value is 1 or 2. If an application uses SDK, it will be 2. If an application uses DRM directly, it will be 1. |
| app.minseclevel | LONG | The min security level as computed from the app certificates supplied. |

-continued

| Variable | TYPE | Description |
|---|---|---|
| secstate.<attribute> | ANY | Retrieve specified attribute value. For example, secstate.firstdateofuse If the attribute does not exist error is returned. For assignments, it is created if it does not exist. The type is same as the type of value assigned to the attribute. |
| secstate.global.saveddatetime | DATETIME | The last saved clock time as recorded by the DRM system. It is particularly useful for ONCLOCKROLLBACK event. This is read-only field for the license. |
| license.<attribute> | STRING | The value of attribute in license DATA section. For e.g., license.LID or license.KID. Note that the attribute is case-sensitive. It is possible that the value is an XML string. For example, license.META will give the entire XML string for META section without the META tags. |
| content.<attribute> | STRING | The value of attribute in content header DATA section. For e.g. content.CID |
| pmlicense.version | STRING | The version of PM license being requested. This field is read-only and can be used in CONDITION part of the right that gives PM license. |
| pmlicense.rights | LONG | The rights to be used for generating PM license, if PM license is allowed to be created. The default value is 0. |
| pmlicense.appseclevel | LONG | The app sec level to be used for generating PM license, if PM license is allowed to be created. The default value is 0. |
| pmlicense.expirydate | DATETIME | The date to be used for generating PM license, if PM license is allowed to be created. The default value is #19991231Z# |

Secure State

Secure State variables are updated as a transaction for the evaluation of a condition or action. If the action results in an error, the secure state is not updated. During evaluation, the secure state cache is updated as soon as the variable is changed. For example, if secstate.playcount is 5 and secstate.playcount+++ secstate.playcount++ is evaluated, it will result in 11. The secstate.playcount will be 7 at the end of evaluation. This behavior may be different from the ones found in, say for example, Visual C++. Expressions with ambiguous meaning like this should be avoided in the license. The C specification indicates that it is up to the implementation to define the behavior and hence several C compilers themselves may yield different results for expressions with side effects. So, avoid such expressions in the license.

EXAMPLES

This section gives some examples of events specified in a license.

License with expiry dates, counted play, and requiring minimum app security level

```
<ONSTORE>
    <ACTION>
        !exists(secstate.playcount)?secstate.playcount = 10:0
    <ACTION>
</ONSTORE>
<ONSELECT>
    <COND>
        machine.datetime <= #20001231 10:00# &&
        app.seclevel >= 500
    </COND>
</ONSELECT>
<ONACTION type="play">
    <COND>
        secstate.playcount > 0
    </COND>
    <ACTION>
        secstate.playcount--
    </ACTION>
</ONACTION>
```

License with effective date

```
<ONSELECT>
    <COND>
        machine.datetime >= #20011231 10:00# &&
    </COND>
</ONSELECT>
```

License that allows one time play with no expiry and deletes itself after the play

```
<ONACTION type="play">
    <ACTION>
        deletelicense()
    </ACTION>
</ONACTION>
```

License that allows play for two days after initial play

```
<ONSTORE>
    <ACTION>
        !exists(secstate.used)?
        (secstate.used = 0;secstate.firstuse = machine.datetime):0
    </ACTION>
</ONSTORE>
<ONSELECT>
    <COND>
        secstate.used == 0 || datediff("d", secstate.firstuse, machine.datetime) <= 2
    </COND>
    <ACTION>
        secstate.used == 0?(secstate.firstuse = machine.datetime;secstate.used = 1):0
    </ACTION>
</ONSELECT>
<ONACTION type="play">
</ONACTION>
```

The invention claimed is:

1. A method of detecting and responding to a rollback of a clock on a computing device to prevent misuse of digital content, the method comprising:

obtaining a current time from the clock;

obtaining a stored time from a secure store of the computing device, the secure store comprising a state store of a digital rights management system on the computing device;

comparing the obtained current time to the obtained stored time to determine whether the obtained current time is earlier than the obtained stored time; and determining that a clock rollback has occurred if the current time is earlier than the stored time, and taking a predetermined course of action based on the determination that the clock rollback has occurred, the method performed in connection with the digital rights management system on the computing device for rendering digital content on the computing device in accordance with a corresponding digital license on the computing device, wherein taking a predetermined course of action based on the determination that the clock rollback has occurred comprises examining the corresponding digital license for event code corresponding to a determined clock rollback, and if present running the event code to prevent misuse of digital content.

2. The method of claim 1 further comprising storing the current time in the secure store as the stored time.

3. The method of claim 1 comprising:
initially:
obtaining a first current time from the clock; and
storing the first obtained time in the secure store as a stored time; and
regularly:
obtaining a second current time from the clock
obtaining the stored time from the secure store
comparing the obtained second current time to the obtained stored time to determine whether the obtained second current time is earlier than the obtained stored time;
determining that a clock rollback has occurred if the second current time is earlier than the stored time, and taking a predetermined course of action based on the determination that the clock rollback has occurred; and
storing the second current time in the secure store as the stored time.

4. The method of claim 3 wherein regularly obtaining the current time comprises obtaining the second current time on a periodic basis.

5. The method of claim 3 wherein regularly obtaining the second current time comprises obtaining the second current time on an event-driven basis.

6. The method of claim 5 wherein regularly obtaining the second current time comprises obtaining the second current time on an event-driven basis selected from a group consisting of upon initialization of the system, upon receiving the corresponding digital license on the computing device, upon receiving the digital content on the computing device, upon receiving a request to employ the corresponding digital license, and upon receiving a request to render the digital content.

7. The method of claim 1 further comprising determining that no clock rollback has occurred if the current time is not earlier than the stored time.

8. The method of claim 1 wherein running the event code results in one of the following events:
the corresponding digital license deleting itself;
the corresponding digital license deleting itself if already expired according to the stored time;
the corresponding digital license deleting itself if having a predetermined age as compared to the stored time; and
the corresponding digital license incrementing a rollback counter and deleting itself after X detected clock rollbacks.

9. A computer-readable medium having stored thereon computer executable instructions for implementing a method of detecting and responding to a rollback of a clock on a computing device to prevent misuse of digital content, the instructions being organized into modules including:

a module for obtaining a current time from the clock;
a module for obtaining a stored time from a secure store of the computing device, the secure store comprising a state store of a digital rights management system on the computing device;
a module for comparing the obtained current time to the obtained stored time to determine whether the obtained current time is earlier than the obtained stored time; and
a module for determining that a clock rollback has occurred if the current time is earlier than the stored time, and taking a predetermined course of action based on the determination that the clock rollback has occurred,
wherein the method is performed in connection with the digital rights management system on the computing device for rendering digital content on the computing device in accordance with a corresponding digital license on the computing device, and wherein taking a predetermined course of action based on the determination that the clock rollback has occurred comprises examining the corresponding digital license for event code corresponding to a determined clock rollback, and if present running the event code to prevent misuse of digital content.

10. The medium of claim 9 further comprising a module for storing the current time in the secure store as the stored time.

11. The medium of claim 9 comprising:
a module for initially:
obtaining a first current time from the clock; and
storing the first obtained time in the secure store as a stored time; and a module for regularly:
obtaining a second current time from the clock;
obtaining the stored time from the secure store;
comparing the obtained second current time to the obtained stored time to determine whether the obtained second current time is earlier than the obtained stored time;
determining that a clock rollback has occurred if the second current time is earlier than the stored time, and taking a predetermined course of action based on the determination that the clock rollback has occurred; and
storing the second current time in the secure store as the stored time.

12. The medium of claim 11 wherein regularly obtaining the current time comprises obtaining the second current time on a periodic basis.

13. The medium of claim 11 wherein regularly obtaining the second current time comprises obtaining the second current time on an event-driven basis.

14. The medium of claim 13 wherein regularly obtaining the second current time comprises obtaining the second current time on an event-driven basis selected from a group consisting of upon initialization of the system, upon receiving the corresponding digital license on the computing device, upon receiving the digital content on the computing device, upon receiving a request to employ the corresponding digital license, and upon receiving a request to render the digital content.

15. The medium of claim 9 further comprising a module for determining that no clock rollback has occurred if the current time is not earlier than the stored time.

16. The medium of claim 9 wherein running the event code results in one of the following events:
the corresponding digital license deleting itself;
the corresponding digital license deleting itself if already expired according to the stored time;

the corresponding digital license deleting itself if having a predetermined age as compared to the stored time; and the corresponding digital license incrementing a rollback counter and deleting itself after X detected clock rollbacks.

17. A method in connection with a system value on a computing device where the system value is expected to be ever-increasing, the method for detecting and responding to a decrease in the system value to prevent misuse of digital content, the method comprising:

obtaining a current system value from the computing device;

obtaining a stored system value from a secure store of the computing device, the secure store comprising a state store of a digital rights management system on the computing device;

comparing the obtained current value to the obtained stored value to determine whether the obtained current value is less than the obtained stored value; and determining that a decrease has occurred if the current value is in fact less than the stored value, and taking a predetermined course of action based on the determination that the decrease has occurred, wherein the method is performed in connection with the digital rights management system on the computing device for rendering digital content on the computing device in accordance with a corresponding digital license on the computing device, and wherein taking a predetermined course of action based on the determination that the decrease has occurred comprises examining the corresponding digital license for event code corresponding to a determined decrease, and if present running the event code to prevent misuse of digital content.

18. A method in connection with a system value on a computing device where the system value is expected to be ever-decreasing, the method for detecting and responding to an increase in the system value to prevent misuse of digital content, the method comprising:

obtaining a current system value from the computing device;

obtaining a stored system value from a secure store of the computing device, the secure store comprising a state store of a digital rights management system on the computing device;

comparing the obtained current value to the obtained stored value to determine whether the obtained current value is greater than the obtained stored value; and determining that an increase has occurred if the current value is in fact greater than the stored value, and taking a predetermined course of action based on the determination that the increase has occurred, wherein the method is performed in connection with the digital rights management system on the computing device for rendering digital content on the computing device in accordance with a corresponding digital license on the computing device, and wherein taking a predetermined course of action based on the determination that the increase, has occurred comprises examining the corresponding digital license for event code corresponding to a determined increase, and if present running the event code to rwevent misuse of digital content.

19. A computer-readable medium having stored thereon computer executable instructions for implementing a method in connection with a system value on a computing device where the system value is expected to be ever-increasing, the method for detecting and responding to a decrease in the system value to prevent misuse of digital content, the instructions being organized into modules including:

a module for obtaining a current system value from the computing device;

a module for obtaining a stored system value from a secure store of the computing device, the secure store comprising a state store of a digital rights management system on the computing device;

a module for comparing the obtained current value to the obtained stored value to determine whether the obtained current value is less than the obtained stored value; and a module for determining that a decrease has occurred if the current value is in fact less than the stored value, and taking a predetermined course of action based on the determination that the decrease has occurred, wherein the method is performed in connection with the digital rights management system on the computing device for rendering digital content on the computing device in accordance with a corresponding digital license on the computing device, and wherein taking a predetermined course of action based on the determination that the decrease has occurred comprises examining the corresponding digital license for event code corresponding to a determined decrease, and if present running the event code to prevent misuse of digital content.

20. A computer-readable medium having stored thereon computer executable instructions for implementing a method in connection with a system value on a computing device where the system value is expected to be ever-decreasing, the method for detecting and responding to an increase in the system value to prevent misuse of digital content, the instructions being organized into modules including:

a module for obtaining a current system value from the computing device;

a module for obtaining a stored system value from a secure store of the computing device, the secure store comprising a state store of a digital rights management system on the computing device;

a module for comparing the obtained current value to the obtained stored value to determine whether the obtained current value is greater than the obtained stored value; and a module for determining that an increase has occurred if the current value is in fact greater than the stored value, and taking a predetermined course of action based on the determination that the increase has occurred, wherein the method is performed in connection with the digital rights management system on the computing device for rendering digital content on the computing device in accordance with a corresponding digital license on the computing device, and wherein taking a predetermined course of action based on the determination that the increase has occurred comprises examining the corresponding digital license for event code corresponding to a determined increase, and if present running the event code to prevent misuse of digital content.

* * * * *